(12) United States Patent
Wijata

(10) Patent No.: US 11,386,668 B2
(45) Date of Patent: Jul. 12, 2022

(54) METHODS AND SYSTEMS FOR FACILITATING LICENSING OF A VEHICLE

(71) Applicant: Hadi Wijata, Lathrop, CA (US)

(72) Inventor: Hadi Wijata, Lathrop, CA (US)

( * ) Notice: Subject to any disclaimer, the term of this patent is extended or adjusted under 35 U.S.C. 154(b) by 21 days.

(21) Appl. No.: 17/139,860

(22) Filed: Dec. 31, 2020

(65) Prior Publication Data
US 2021/0406555 A1 Dec. 30, 2021

Related U.S. Application Data

(60) Provisional application No. 63/044,254, filed on Jun. 25, 2020.

(51) Int. Cl.
| | |
|---|---|
| *G06V 20/52* | (2022.01) |
| *G06V 10/22* | (2022.01) |
| *G06V 10/46* | (2022.01) |
| *G06V 20/62* | (2022.01) |
| *G06V 30/10* | (2022.01) |

(52) U.S. Cl.
CPC .............. *G06V 20/52* (2022.01); *G06V 10/22* (2022.01); *G06V 10/462* (2022.01); *G06V 20/625* (2022.01); *G06V 30/10* (2022.01); *G06V 2201/08* (2022.01)

(58) Field of Classification Search
CPC .... G06V 20/625; G06V 20/52; G06V 30/153; G06V 10/10; G06V 20/54; G06V 40/161; G06V 10/56; G06V 2201/08; G06V 10/22; G06V 10/462; G06V 30/10
See application file for complete search history.

(56) References Cited

U.S. PATENT DOCUMENTS

| | | | |
|---|---|---|---|
| 10,929,661 B1 * | 2/2021 | Manyam | G06V 20/52 |
| 2005/0027541 A1 * | 2/2005 | Hagood | G06Q 10/10 |
| | | | 358/1.18 |
| 2005/0194435 A1 * | 9/2005 | Smith | G06K 19/06187 |
| | | | 340/5.86 |

(Continued)

FOREIGN PATENT DOCUMENTS

| | | | | | |
|---|---|---|---|---|---|
| CN | 110796578 A | * | 2/2020 | | |
| CN | 111225339 A | * | 6/2020 | | G08G 1/127 |

(Continued)

*Primary Examiner* — Nizar N Sivji

(57) ABSTRACT

Disclosed herein is a method for facilitating licensing of a vehicle. Accordingly, the method may include receiving, using a communication device, vehicle information associated with the vehicle from a device. Further, the method may include analyzing, using a processing device, the vehicle information. Further, the method may include determining, using the processing device, identifiers associated with the vehicle based on the analyzing. Further, the method may include generating, using the processing device, symbols corresponding to the identifiers based on the determining. Further, the method may include generating, using the processing device, a license plate image for a license plate of the vehicle based on the generating of the symbols. Further, the method may include transmitting, using the communication device, the license plate image associated with the vehicle to the device. Further, the method may include storing, using a storage device, the license plate image and the vehicle information.

20 Claims, 41 Drawing Sheets

(56) References Cited

U.S. PATENT DOCUMENTS

| | | | | |
|---|---|---|---|---|
| 2006/0162196 A1* | 7/2006 | Kaiser | ............... | B60R 13/10 |
| | | | | 40/208 |
| 2017/0046929 A1* | 2/2017 | Strom | ............... | G08B 25/08 |
| 2021/0097295 A1* | 4/2021 | Sharma | ............ | G06V 20/52 |

FOREIGN PATENT DOCUMENTS

| | | | | | |
|---|---|---|---|---|---|
| JP | 2020531341 A | * | 11/2020 | | |
| KR | 101875731 B1 | * | 7/2018 | | |
| WO | WO-2010077257 A1 | * | 7/2010 | ............ | G06Q 10/08 |

\* cited by examiner

— 2900

| Province | Current System (Coding Area) | New System |
|---|---|---|
| North Sumantra | 2 | 1 |
| West of Java | 5 | 1 |
| Central of Java | 7 | 1 |
| East of Java | 8 | 1 |
| West Nusa Tenggara | 2 | 1 |
| East Nusa Tenggara | 3 | 1 |
| 28 the other provinces | 1 x 28 | 1 x 28 |
| Totals | 55 | 34 |

FIG. 29

METHODS AND SYSTEMS FOR FACILITATING LICENSING OF A VEHICLE

The current application claims a priority to the U.S. provisional patent application Ser. No. 63/044,254 filed on Jun. 25, 2020.

FIELD OF THE INVENTION

Generally, the present disclosure relates to the field of data processing. More specifically, the present disclosure relates to methods and systems for facilitating the licensing of a vehicle.

BACKGROUND OF THE INVENTION

The current system of Indonesian license plates is distinguished by color. The color of the license plate identifies the status of a vehicle or type of vehicle. Types of vehicles include private, commercial, government, diplomat, counselor, military position, and vehicles of free trade zones. The central Indonesian government has the same color as that of private license plates. The lettering convention denotes the area of registration which is dictated by the Dutch colonial era and does not reflect the current regional divisions of the country. Instead, the current Indonesian license plate system follows the old system of Dutch residencies or Karesidenan. The existing system of Dutch Karesidenan or residencies uses double standards between residences and provinces. The current system has been in place since 1945 and is complicated because some provinces use one system license plate and other provinces use a residencies system, especially Java Island.

Therefore, there is a need for improved methods and systems for facilitating the licensing of a vehicle that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is a method for facilitating licensing of a vehicle, in accordance with some embodiments. Accordingly, the method may include a step of receiving, using a communication device, vehicle information associated with the vehicle from at least one device. Further, the method may include a step of analyzing, using a processing device, the vehicle information. Further, the method may include a step of determining, using the processing device, a plurality of identifiers associated with the vehicle based on the analyzing. Further, the plurality of identifiers may include each of a geographical region identifier and a vehicle type identifier associated with the vehicle. Further, the method may include a step of generating, using the processing device, a plurality of symbols corresponding to the plurality of identifiers based on the determining. Further, the plurality of symbols may include a plurality of visual features. Further, the plurality of visual features may include at least one of a color, a shape, a size, and a location of the plurality of symbols. Further, at least one visual feature of the plurality of visual features corresponds to at least one identifier of the plurality of identifiers. Further, the plurality of symbols uniquely and visually represents the plurality of identifiers. Further, the method may include a step of generating, using the processing device, a license plate image for a license plate of the vehicle based on the generating of the plurality of symbols. Further, the license plate image may include the plurality of symbols. Further, the method may include a step of transmitting, using the communication device, the license plate image associated with the vehicle to the at least one device. Further, the method may include a step of storing, using a storage device, the license plate image and the vehicle information.

Further disclosed herein is a system for facilitating licensing of a vehicle, in accordance with some embodiments. Accordingly, the system may include a communication device configured for receiving vehicle information associated with the vehicle from at least one device. Further, the communication device may be configured for transmitting a license plate image associated with the vehicle to the at least one device. Further, the system may include a processing device communicatively coupled with the communication device. Further, the processing device may be configured for analyzing the vehicle information. Further, the processing device may be configured for determining a plurality of identifiers associated with the vehicle based on the analyzing. Further, the plurality of identifiers may include each of a geographical region identifier and a vehicle type identifier associated with the vehicle. Further, the processing device may be configured for generating a plurality of symbols corresponding to the plurality of identifiers based on the determining. Further, the plurality of symbols may include a plurality of visual features. Further, the plurality of visual features may include at least one of a color, a shape, a size, and a location of the plurality of symbols. Further, at least one visual feature of the plurality of visual features corresponds to at least one identifier of the plurality of identifiers. Further, the plurality of symbols uniquely and visually represents the plurality of identifiers. Further, the processing device may be configured for generating the license plate image for a license plate of the vehicle based on the generating of the plurality of symbols. Further, the license plate image may include the plurality of symbols. Further, the system may include a storage device communicatively coupled to the processing device. Further, the storage device may be configured for storing the license plate image and the vehicle information.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and subcombinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

FIG. 29 is a table illustrating a coding concept for facilitating the licensing of the vehicle, in accordance with some embodiments.

DETAIL DESCRIPTIONS OF THE INVENTION

Figure 1:
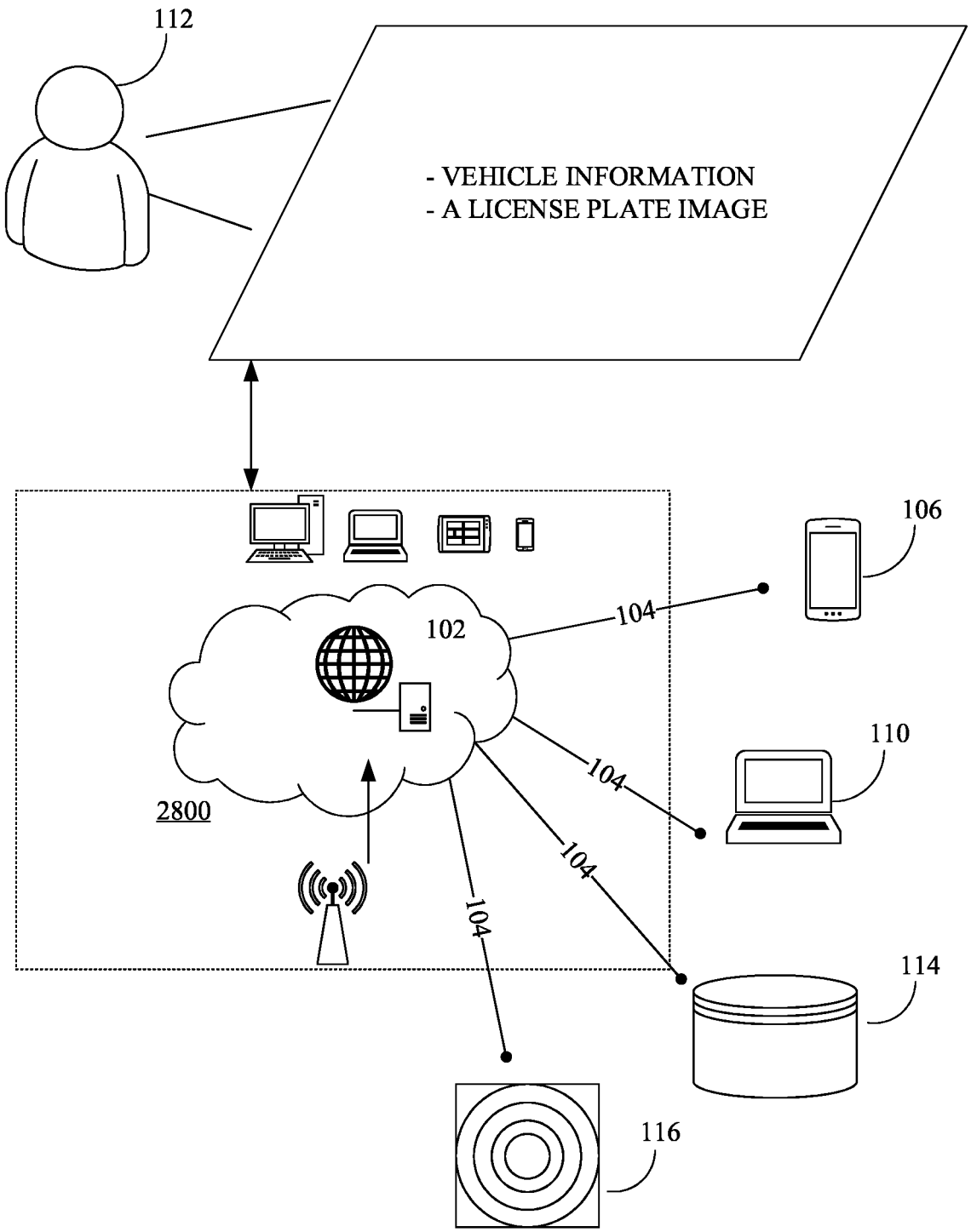
FIG. 1 is an illustration of an online platform consistent with various embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header. The present disclosure includes many aspects and features. Moreover, while many aspects and features relate to, and are described in the context of methods and systems for facilitating licensing of a vehicle, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor and at least one actuator. Examples of the one or more client devices and/or the server computer may include, a desktop computer, a laptop computer, a tablet computer, a personal digital assistant, a portable electronic device, a wearable computer, a smart phone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice based interface, gesture based interface etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third party database, public database, a private database and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role based access control, and so on.

Further, one or more steps of the method disclosed herein may be initiated, maintained, controlled and/or terminated based on a control input received from one or more devices operated by one or more users such as, for example, but not limited to, an end user, an admin, a service provider, a service consumer, an agent, a broker and a representative thereof. Further, the user as defined herein may refer to a human, an animal or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human readable secret data (e.g. username, password, passphrase, PIN, secret question, secret answer etc.) and/or possession of a machine readable secret data (e.g. encryption key, decryption key, bar codes, etc.) and/or possession of one or more embodied characteristics unique to the user (e.g. biometric variables such as, but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smartcard with an authentication token stored thereupon, etc.). Accordingly, the one or more steps of the method may include communicating (e.g. transmitting and/or receiving) with one or more sensor devices and/or one or more actuators in order to perform authentication. For example, the one or more steps may include receiving, using the communication device, the secret human readable data from an input device such as, for example, a keyboard, a keypad, a touch-screen, a microphone, a camera and so on. Likewise, the one or more steps may include receiving, using the communication device, the one or more embodied characteristics from one or more biometric sensors.

Further, one or more steps of the method may be automatically initiated, maintained and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device etc.) corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, an indoor location sensor etc.), a biometric sensor (e.g. a fingerprint sensor), an environmental variable sensor (e.g. temperature sensor, humidity sensor, pressure sensor, etc.) and a device state sensor (e.g. a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more and devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data and any intermediate data therebetween corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

Overview

The present disclosure describes methods and systems for facilitating the licensing of a vehicle. Further, the disclosed system for Indonesian license plates is consistent and efficient. The disclosed license plate may be attractive and can promote tourism, endangered animals, and special events. Further, the disclosed license plate may focus on the categorization of regions, provinces, and types of vehicles. The disclosed license plate may include a barcode for each license plate to deter theft and reduce illegal duplication of license plates. Further, the disclosed license plate may include an attractive background that may promote tourism, endangered animals, universities, companies, political parties, military positions, and other events, can make more revenue due to the specificity of each license plate, and reduce the improper and illegal duplication of license plates. Further, the disclosed license plate may identify the region, province, and type of vehicle associated with a given vehicle and provides individual identification via barcodes. The regions of Indonesia include Sumatera Island, Papua, Kalimantan (Borneo), Bali, Sulawesi, Maluku, and Java Island. The provinces include all the provinces recognized by the Indonesian government. Indonesia comprises thirty-three provinces. The types of vehicles include private vehicles, commercial vehicles, motorcycle vehicles, special interest vehicles, central government vehicles, and local government vehicles. The categories of regions are defined by a color. The provinces are defined by a logo. The type of vehicle is defined by a specific number and letter combination. The combination of the color, logo, and a specific number and letter combination efficiently and accurately categorizes and identifies license plates, specifically those of Indonesia. Each license plate has a barcode to prevent the improper and illegal duplication of the license plates.

Further, each region may be associated with a color. The colors include green, sky blue, orange, brown, black, and navy blue. Further, the region of Sumatera Island may be associated with green. Further, Papua may be associated with sky blue. Further, Kalimantan (Borneo) may be associated with orange. Further, Bali may be associated with brown. Further, Sulawesi & Maluku may be associated with black.

Further, Java Island may be associated with navy blue. Further, the Sumatera island numbers 1-9 and 0 may be associated with green color. Further, the Jawa island number 1-6 may be associated with blue navy color. Further, the Borneo island number 1-5 may be associated with orange color. Further, the Celebes and Mollusca numbers 1-9 may be associated with black color. Further, the Bali Island, West Nusa Tenggara, East Nusa Tenggara number 1-3 may be associated with brown color. Further, the Papua and West Papua numbers 1-2 may be associated with blue sky color.

Further, in an embodiment, the disclosed license plates may include a different combination of regions and colors as well as additional colors. Further, associated colors may be integrated into a variety of aspects of a license plate depending on the type of vehicle. Further, the disclosed license plate may include background, number, and letter combination. The color may be represented in the background of a license plate categorized as a local government vehicle. The disclosed license plate may include a white print on a colored background.

Further, a color may be represented in the text of a license plate categorized as a private vehicle, commercial vehicle, a motorcycle vehicle, a special interest vehicle, and central government vehicle. The disclosed license plate may include a white background behind the colored text.

New system Indonesian license plates with the coding area for 34 provinces. Numbers and letters green for Sumatera island, blue navy for Java island, orange for Borneo island, brown for Bali islands—West Nusa Tenggara—East Nusa Tenggara, black for Celebes and Maluku island, and blue sky for Papua.

The first number on the license plate is coding area province, for private vehicle 4 wheel and up, and the commercial vehicle 4 wheel and up. License plates for the government vehicle, the number and the letter with the white color, the background color green for Sumatera island, blue navy for Java island, orange for Borneo islands, brown color for Bali NTB and NTT, black color for Celebes and Maluku, and blue sky for Papua. For motorcycle license plates the last number after ABC is the coding for provinces. The new system Indonesian license plate has barcode QR. The barcode has information about the owner's vehicle, address of the owner, type of vehicle, engine capacity (CC), machine number, chassis number, and the date of registration expire. Custom license plate with special numbers, letters, and view background for auction purposes.

Further, the disclosed Indonesian license plates for a private vehicle with 4 wheels and up may include a first number on [NNNN logo province LLLL] license plate=for provinces, 3 numbers and 4 letters next are combine random numbers and letters. The color numbers and letters depending on the coding province categorized. Further, the disclosed license plate for local government from red color change to green for Sumatera island, blue navy for Jawa Island, orange for Borneo island, brown for Bali-NTB-NTT, black for Celebes, and Maluku island, and blue sky for Papua. Number "1" may be associated with Governor, number "2" for Vice Governor, and so on.

Further, the disclosed license plate for a commercial vehicle, the first number is coding province [N logo province NNNNNNN], the numbers after the logo are combined random numbers. The color number may depend on coding province categories.

Further, a last number of the disclosed license plate for motorcycle 2 wheels or 3 wheels may be associated with provinces. The four numbers and 3 letters may be combined randomly, [NNNN logo province LLLN].

Further, in an embodiment, the disclosed license plate may be associated with diplomatic and general for the United States of America.

Further, the disclosed license plate for private vehicles with 4 wheels and more may be [1 ABC logo 1234] for Aceh. Further, the disclosed license plate for private vehicles with 4 wheels and more may be [2ABC logo 1234] for Sumatera Utara. Further, the disclosed license plate for private vehicles with 4 wheels and more may be [3ABC logo 1234] for Sumatera Barat. Further, the disclosed license plate for private vehicles with 4 wheels and more may be [4ABC logo 1234] for Riau. Further, a first number on the disclosed license plate for private vehicles with 4 wheels and more may be associated with provinces and 3 letters and 4 numbers may be random.

Further, the disclosed license plate for commercial vehicles may be [1 logo 1234567] for Banten province with navy blue color. Further, the disclosed license plate for commercial vehicles may be [2 logo 1234567] for Jakarta with blue navy color. Further, the disclosed license plate for commercial vehicles may be [3 logo 1234567] for Jawa Barat (West of Jawa province).

Each of the provinces of Indonesia has an associated logo. Each logo comprises a unique design to best represent each province. The logo of a license plate is incorporated into the specific number and letter combination. The logo may come before the specific number and letter combination, come between the specific number and letter combination, or come after the specific number and letter combination. The logo further categorizes the identity of each license plate.

Further, a barcode of each license plate is printed on the license plate. The barcode is associated with the specific number and letter combination. Further, the barcode may be integrated into the front of the license plate. Further, the front face may present the specific number and letter combination, and logo. Further, the disclosed license plate may include the barcodes or QR. Further, the barcodes may include information color of the car, the owner of the car, model of the car, the address of the owner, engine capacity, and chassis number.

The disclosed system for Indonesian license plates allows for easier identification among vehicles. The region associated with the vehicle may be represented by the color of the background or text of the specific number and letter combination. The province associated with the vehicle is represented by the design of the logo. The type of vehicle is represented by the specific number and letter combination that includes the arrangement of the numbers and letters and the number of letters. Further, the disclosed license plates may include a specific location of the logo in relation to the numbers and letters per type of vehicle. Further, the disclosed license plates may be customized via the background and logos.

The disclosed system for Indonesian license plates may inhibit the illegal duplication of the license plates via the barcode of each license plate. Further, a police officer simply scans the barcode to determine whether the vehicle is properly registered and to view any legal information regarding the vehicle or the owner of the vehicle.

Further, the disclosed license plates for Indonesia may be coded in green, blue navy, orange, brown, black, and blue sky color for 34 provinces. Indonesia has 34 provinces; this means the new design is for all 34 provinces. Further, a license plate of a motorcycle vehicle may include three numbers followed by three letters.

Further, the disclosed license plates may include barcode, sticker of the month, sticker of the year registration, and the letters of the province in the middle up of the license plate.

Referring now to figures, FIG. 1 is an illustration of an online platform 100 consistent with various embodiments of the present disclosure. By way of non-limiting example, the online platform 100 to facilitate licensing of a vehicle may be hosted on a centralized server 102, such as, for example, a cloud computing service. The centralized server 102 may communicate with other network entities, such as, for example, a mobile device 106 (such as a smartphone, a laptop, a tablet computer, etc.), other electronic devices 110 (such as desktop computers, server computers, etc.), databases 114, and sensors 116 over a communication network 104, such as, but not limited to, the Internet. Further, users of the online platform 100 may include relevant parties such as, but not limited to, end-users, administrators, service providers, service consumers, and so on. Accordingly, in some instances, electronic devices operated by the one or more relevant parties may be in communication with the platform.

A user 112, such as the one or more relevant parties, may access online platform 100 through a web based software application or browser. The web based software application may be embodied as, for example, but not be limited to, a website, a web application, a desktop application, and a mobile application compatible with a computing device 2800.

Figure 2:
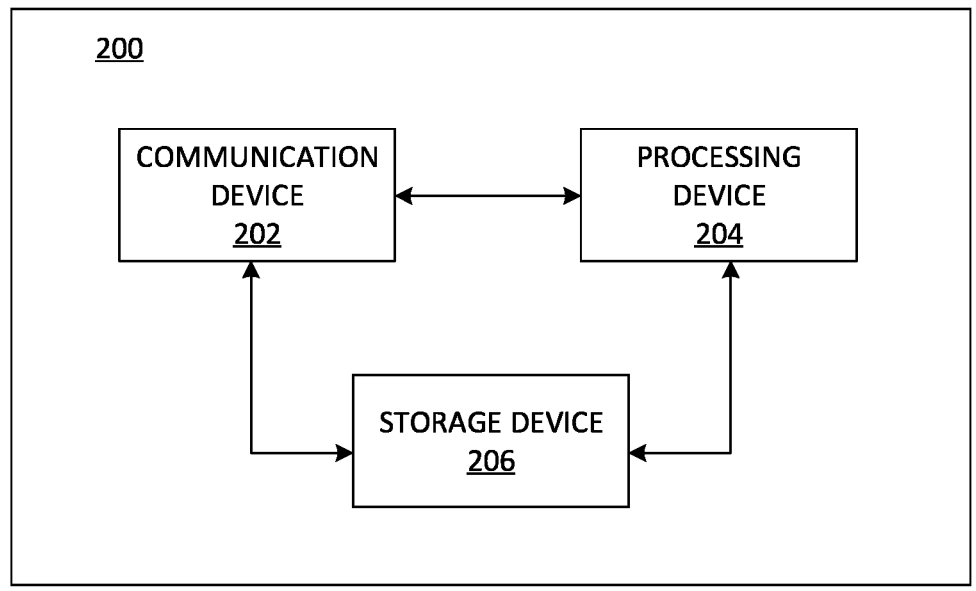
FIG. 2 is a block diagram of a system for facilitating licensing of a vehicle, in accordance with some embodiments.

FIG. 2 is a block diagram of a system 200 for facilitating licensing of a vehicle, in accordance with some embodiments. Accordingly, the system 200 may include a communication device 202 configured for receiving vehicle information associated with the vehicle from at least one device. Further, the communication device 202 may be configured for transmitting a license plate image associated with the vehicle to the at least one device. Further, the vehicle information may include a make, a model, a brand, a place of purchase, etc. Further, the vehicle information may include a vehicle owner information associated with a vehicle owner, wherein the vehicle owner information may include personal information, financial information, etc.

Figure 27:
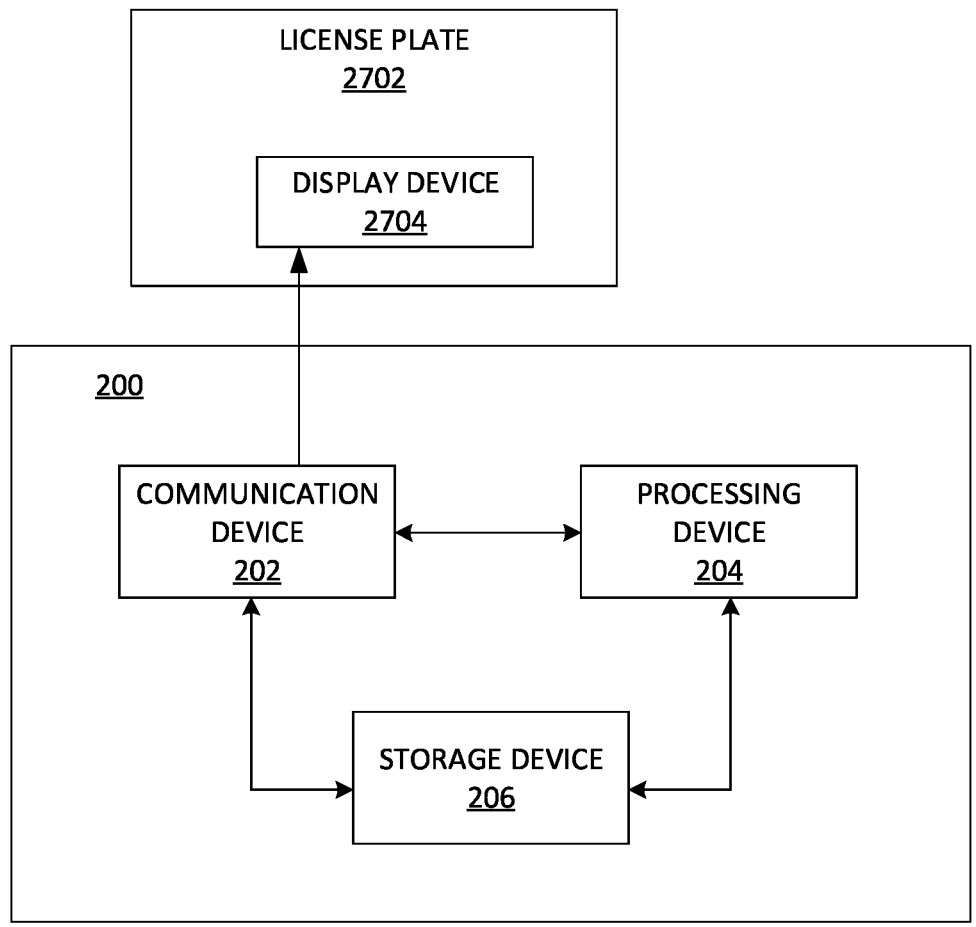
FIG. 27 is a block diagram of the system for facilitating the licensing of the vehicle, in accordance with some embodiments.

Further, the system 200 may include a processing device 204 communicatively coupled with the communication device 202. Further, the processing device 204 may be configured for analyzing the vehicle information. Further, the processing device 204 may be configured for determining a plurality of identifiers associated with the vehicle based on the analyzing. Further, the plurality of identifiers may include each of a geographical region identifier and a vehicle type identifier associated with the vehicle. Further, the processing device 204 may be configured for generating a plurality of symbols corresponding to the plurality of identifiers based on the determining. Further, the plurality of symbols may include a plurality of visual features. Further, the plurality of visual features may include at least one of a color, a shape, a size, and a location of the plurality of symbols. Further, at least one visual feature of the plurality of visual features corresponds to at least one identifier of the plurality of identifiers. Further, the plurality of symbols uniquely and visually represents the plurality of identifiers. Further, the processing device 204 may be configured for generating the license plate image for a license plate 2702 (as shown in FIG. 27) of the vehicle based on the generating of the plurality of symbols. Further, the license plate image may include the plurality of symbols. Further, the plurality of symbols may include an alphanumeric character, a logo, a background, a bar code, a QR code, etc. Further, the vehicle type identifier may include a usage of the vehicle, a number of wheels of the vehicle, etc. Further, the usage of the vehicle may include personal usage, business usage, etc. Further, the number of wheels may include 2 wheels, 3 wheels, 4 wheels, etc. Further, the vehicle type identifier may include 4 wheels or up, 2 or 3 wheels, commercial vehicle, local government, diplomatic, etc. Further, the geographical region identifier may include a region and a province of a country. Further, the geographical region identifier may include a city, a county, a state, etc.

Further, in some embodiments, the geographical region identifier corresponds to a province of a plurality of provinces of Indonesia. Further, a province symbol of the plurality of symbols corresponds to the province of the plurality of provinces. For example, the plurality of provinces of Indonesia may include thirty-four provinces of Indonesia. Further, the province symbol of the plurality of symbols uniquely and visually represent each province of the thirty-four provinces of Indonesia. Further, the vehicle type identifier corresponds to a type of fuel used for powering the vehicle. Further, the type of fuel used for the powering of the vehicle may include a fossil fuel, an electric battery, etc. Further, a symbol of the plurality of symbols corresponds to the type of fuel used for the powering of the vehicle. Further, a visual feature of the plurality of visual features corresponds to the type of fuel used for the powering of the vehicle. For example, the visual feature of the plurality of visual features of the symbol may include a color of the symbol. Further, the color of the symbol may be a blue color for the type of fuel used for the powering of the vehicle may be the electric battery. Further, the color of the symbol may be a black color for the type of fuel used for the powering of the vehicle may be the fossil fuel. Further, the symbol may include a bar code, a QR code, etc. Further, the color of the bar code, the QR code, etc., may visually and uniquely represent the type of fuel used for the powering of the vehicle. Further, the blue color of the bar code, the QR code, etc., represents that the type of fuel used for the powering of the vehicle may the electric battery. Further, the black color of the bar code, the QR code, etc., represents that the type of fuel used for the powering of the vehicle may the fossil fuel.

Further, the system 200 may include a storage device 206 communicatively coupled to the processing device 204. Further, the storage device 206 may be configured for storing the license plate image and the vehicle information.

Further, in some embodiments, the communication device 202 may be configured for receiving a first license plate image associated with a first license plate of a first vehicle from at least one first device. Further, the communication device 202 may be configured for transmitting first vehicle information associated with the first vehicle to the at least one first device. Further, the processing device 204 may be configured for analyzing the first license plate image. Further, the processing device 204 may be configured for identifying the plurality of symbols and the plurality of visual features of the plurality of symbols comprised in the first license plate image based on the analyzing of the first license plate image. Further, the processing device 204 may be configured for generating the first vehicle information associated with the first vehicle based on the identifying.

Further, in some embodiments, the plurality of symbols may include at least one of a plurality of first symbols and a plurality of second symbols. Further, the plurality of first symbols may be human-readable. Further, the plurality of second symbols may be non-human readable.

Further, in some embodiments, the plurality of first symbols and a plurality of first visual features associated with the plurality of first symbols forms at least one visual identifier of the vehicle. Further, the at least one visual identifier corresponds to the at least one identifier of the vehicle. Further, the at least one visually identifier may be visually perceivable by at least one individual. Further, the at least one visual identifier visually identifies the at least one identifier of the vehicle. Further, the at least one visual identifier may be visual representation of the at least one identifier.

Further, in some embodiments, the plurality of second symbols and a plurality of second visual features associated with the plurality of second symbols forms at least one first visual identifier of the vehicle. Further, the at least one first visual identifier corresponds to the at least one identifier of the vehicle. Further, the at least one first visual identifier may be visually perceivable by at least one external device. Further, the at least one first visual identifier visually identifies the at least one identifier of the vehicle. Further, the at least one first visual identifier may be a visual representation of the at least one identifier.

Further, in some embodiments, each symbol of the plurality of symbols may be associated with a range of predetermined symbols. Further, each visual feature of the plurality of visual features may be associated with a range of predetermined visual features. Further, the range of predetermined symbols and the range of predetermined visual features of the range of predetermined symbols characterizes the license plate image for visually identifying a validity of the license plate image.

Further, in some embodiments, the license plate 2702 may include a display device 2704 (as shown in FIG. 27) disposed on the license plate 2702. Further, the display device 2704 may be configured for displaying the license plate image. Further, the communication device 202 may be configured for transmitting the license plate image to the display device 2704. Further, the displaying of the license plate image may be based on transmitting.

Further, in some embodiments, the license plate 2702 may include at least one location sensor configured for generating at least one location information associated with a geographical location of the vehicle. Further, the communication device 202 may be configured for receiving the at least one location information from the at least one location sensor. Further, the communication device 202 may be configured for transmitting at least one symbol to the display device 2704. Further, the display device 2704 may be configured for displaying the at least one symbol. Further, the processing device 204 may be configured for analyzing the at least one location information. Further, the processing device 204 may be configured for determining the geographical region identifier of the vehicle based on the analyzing of the at least one location information. Further, the processing device 204 may be configured for identifying the at least one symbol of the plurality of symbols based on the determining of the geographical region identifier. Further, the at least one symbol visually represents the geographical region identifier.

Further, in some embodiments, the license plate 2702 may include at least one sensor configured for generating at least one sensor data associated with at least one of a cargo and a passenger transported by the vehicle. Further, the communication device 202 may be configured for receiving the at least one sensor data from the at least one sensor. Further, the communication device 202 may be configured for transmitting at least one third symbol to the display device 2704. Further, the display device 2704 may be configured for displaying the at least one third symbol. Further, the processing device 204 may be configured for analyzing the at least one sensor data. Further, the processing device 204 may be configured for identifying the at least one of the cargo and the passenger transported by the vehicle based on the analyzing. Further, the processing device 204 may be configured for determining the vehicle type identifier of the vehicle based on the identifying of the at least one of the cargo and the passenger. Further, the processing device 204 may be configured for identifying the at least one third symbol of the plurality of symbols based on the determining of the vehicle type identifier. Further, the at least one third symbol visually represents the vehicle type identifier.

Further, in some embodiments, the communication device 202 may be configured for receiving a plurality of location information from a plurality of location sensors associated with a plurality of license plates of a plurality of vehicles. Further, the communication device 202 may be configured for transmitting a preselected symbol of the plurality of symbols to a plurality of display devices of a plurality of selected license plates of a plurality of selected vehicles of the plurality of vehicles. Further, the plurality of display devices may be configured for displaying the preselected symbol. Further, the processing device 204 may be configured for analyzing the plurality of location information based on a preselected geographical region identifier of the geographical region identifier. Further, the processing device 204 may be configured for identifying the plurality of selected vehicles of the plurality of vehicles based on the analyzing of the plurality of location information.

Further, in some embodiments, the license plate image may include the plurality of symbols in at least one format based on at least one of the geographical region identifier and the vehicle type identifier. Further, the at least one format corresponds to at least one arrangement of at least one symbol segment of the plurality of symbols on the license plate image.

Figure 3:
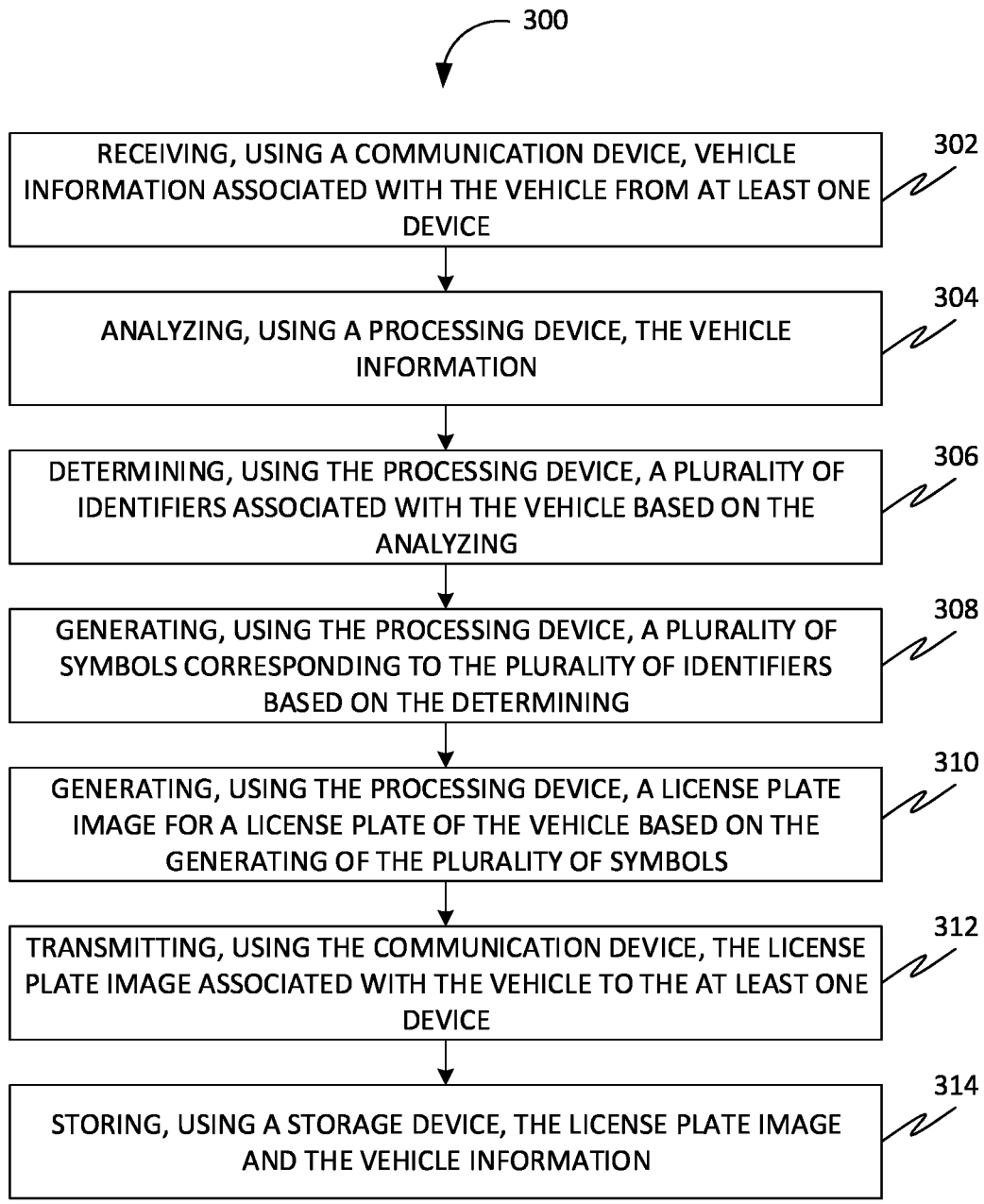
FIG. 3 is a flowchart of a method for facilitating licensing of a vehicle, in accordance with some embodiments.

FIG. 3 is a flowchart of a method 300 for facilitating licensing of a vehicle, in accordance with some embodiments. Accordingly, at 302, the method 300 may include a step of receiving, using a communication device, vehicle information associated with the vehicle from at least one device. Further, the vehicle information comprises a make, a model, a brand, a place of purchase, etc. Further, the vehicle information comprises a vehicle owner information associated with a vehicle owner, wherein the vehicle owner information comprises personal information, financial information, etc.

Further, at 304, the method 300 may include a step of analyzing, using a processing device, the vehicle information.

Further, at 306, the method 300 may include a step of determining, using the processing device, a plurality of identifiers associated with the vehicle based on the analyzing. Further, the plurality of identifiers may include each of a geographical region identifier and a vehicle type identifier associated with the vehicle. Further, the geographical region identifier may include a region and a province of a country. Further, the geographical region identifier may include a city, a county, a state, etc. Further, the vehicle type identifier may include a usage of the vehicle, the number of wheels of the vehicle, etc. Further, the usage of the vehicle may include personal usage, business usage, etc. Further, the number of wheels may include 2 wheels, 3 wheels, 4 wheels, etc. Further, the vehicle type identifier may include 4 wheels or up, 2 or 3 wheels, commercial vehicle, local government, diplomatic, etc.

Further, at 308, the method 300 may include a step of generating, using the processing device, a plurality of symbols corresponding to the plurality of identifiers based on the determining. Further, the plurality of symbols may include a plurality of visual features. Further, the plurality of visual features may include at least one of a color, a shape, a size, and a location of the plurality of symbols. Further, at least one visual feature of the plurality of visual features corresponds to at least one identifier of the plurality of identifiers. Further, the plurality of symbols uniquely and visually represents the plurality of identifiers. Further, the plurality of symbols may include an alphanumeric character, a logo, a background, a bar code, a QR code, etc.

Further, at 310, the method 300 may include a step of generating, using the processing device, a license plate image for a license plate of the vehicle based on the generating of the plurality of symbols. Further, the license plate image may include the plurality of symbols.

Further, at 312, the method 300 may include a step of transmitting, using the communication device, the license plate image associated with the vehicle to the at least one device.

Further, at 314, the method 300 may include a step of storing, using a storage device, the license plate image and the vehicle information.

Further, in some embodiments, the plurality of symbols may include at least one of a plurality of first symbols and a plurality of second symbols. Further, the plurality of first symbols may be human-readable. Further, the plurality of second symbols may be non-human readable.

Further, in some embodiments, the plurality of first symbols and a plurality of first visual features associated with the plurality of first symbols forms at least one visual identifier of the vehicle. Further, the at least one visual identifier corresponds to the at least one identifier of the vehicle. Further, the at least one visual identifier may be visually perceivable by at least one individual. Further, the at least one visual identifier visually identifies the at least one identifier of the vehicle. Further, the at least one visual identifier may be visual representation of the at least one identifier.

Further, in some embodiments, the plurality of second symbols and a plurality of second visual features associated with the plurality of second symbols forms at least one first visual identifier of the vehicle. Further, the at least one first visual identifier corresponds to the at least one identifier of the vehicle. Further, the at least one first visual identifier may be visually perceivable by at least one external device. Further, the at least one first visual identifier visually identifies the at least one identifier of the vehicle. Further, the at least one first visual identifier may be a visual representation of the at least one identifier.

Further, in some embodiments, each symbol of the plurality of symbols may be associated with a range of predetermined symbols. Further, each visual feature of the plurality of visual features may be associated with a range of predetermined visual features. Further, the range of predetermined symbols and the range of predetermined visual features of the range of predetermined symbols characterizes the license plate image for visually identifying a validity of the license plate image.

Further, in some embodiments, the license plate may include a display device disposed on the license plate. Further, the display device may be configured for displaying the license plate image. Further, the method 300 may include transmitting, using the communication device, the license plate image to the display device. Further, the displaying of the license plate image may be based on transmitting.

Further, in some embodiments, the geographical region identifier corresponds to a province of a plurality of provinces of Indonesia. Further, a province symbol of the plurality of symbols corresponds to the province of the plurality of provinces. For example, the plurality of provinces of Indonesia may include thirty-four provinces of Indonesia. Further, the province symbol of the plurality of symbols uniquely and visually represent each province of the thirty-four provinces of Indonesia. Further, the vehicle type identifier corresponds to a type of fuel used for powering the vehicle. Further, the type of fuel used for the powering of the vehicle may include a fossil fuel, an electric battery, etc. Further, a symbol of the plurality of symbols corresponds to the type of fuel used for the powering of the vehicle. Further, a visual feature of the plurality of visual features corresponds to the type of fuel used for the powering of the vehicle. For example, the visual feature of the plurality of visual features of the symbol may include a color of the symbol. Further, the color of the symbol may be a blue color for the type of fuel used for the powering of the vehicle may be the electric battery. Further, the color of the symbol may be a black color for the type of fuel used for the powering of the vehicle may be the fossil fuel. Further, the symbol may include a bar code, a QR code, etc. Further, the color of the bar code, the QR code, etc., may visually and uniquely represent the type of fuel used for the powering of the vehicle. Further, the blue color of the bar code, the QR code, etc., represents that the type of fuel used for the powering of the vehicle may the electric battery. Further, the black color of the bar code, the QR code, etc., represents that the type of fuel used for the powering of the vehicle may the fossil fuel.

Further, in some embodiments, the license plate image may include the plurality of symbols in at least one format based on at least one of the geographical region identifier and the vehicle type identifier. Further, the at least one format corresponds to at least one arrangement of at least one symbol segment of the plurality of symbols on the license plate image.

Figure 4:
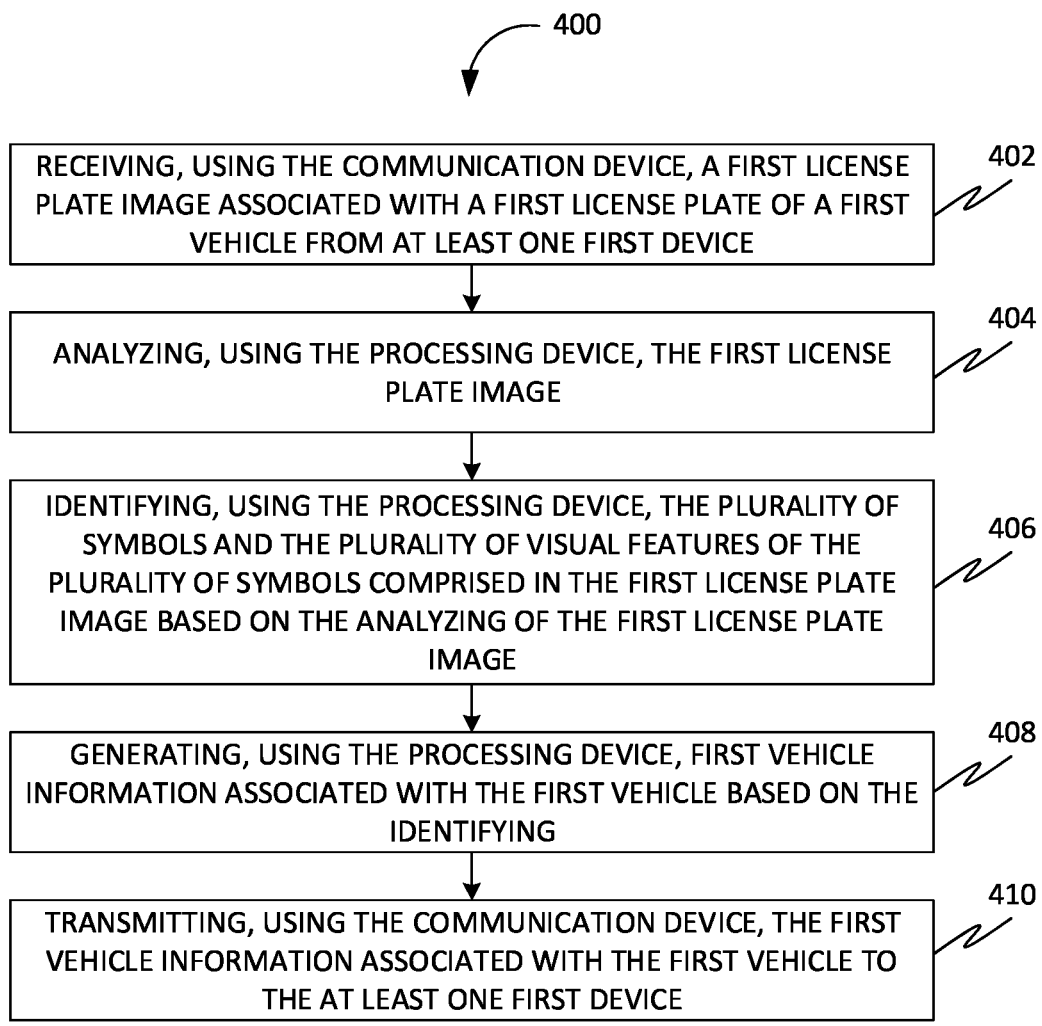
FIG. 4 is a flowchart of a method for generating first vehicle information for facilitating the licensing of the vehicle, in accordance with some embodiments.

FIG. 4 is a flowchart of a method 400 for generating first vehicle information for facilitating the licensing of the vehicle, in accordance with some embodiments. Accordingly, at 402, the method 400 may include a step of receiving, using the communication device, a first license plate image associated with a first license plate of a first vehicle from at least one first device.

Further, at 404, the method 400 may include a step of analyzing, using the processing device, the first license plate image.

Further, at 406, the method 400 may include a step of identifying, using the processing device, the plurality of symbols and the plurality of visual features of the plurality of symbols comprised in the first license plate image based on the analyzing of the first license plate image.

Further, at 408, the method 400 may include a step of generating, using the processing device, the first vehicle information associated with the first vehicle based on the identifying.

Further, at 410, the method 400 may include a step of transmitting, using the communication device, the first vehicle information associated with the first vehicle to the at least one first device.

Figure 5:
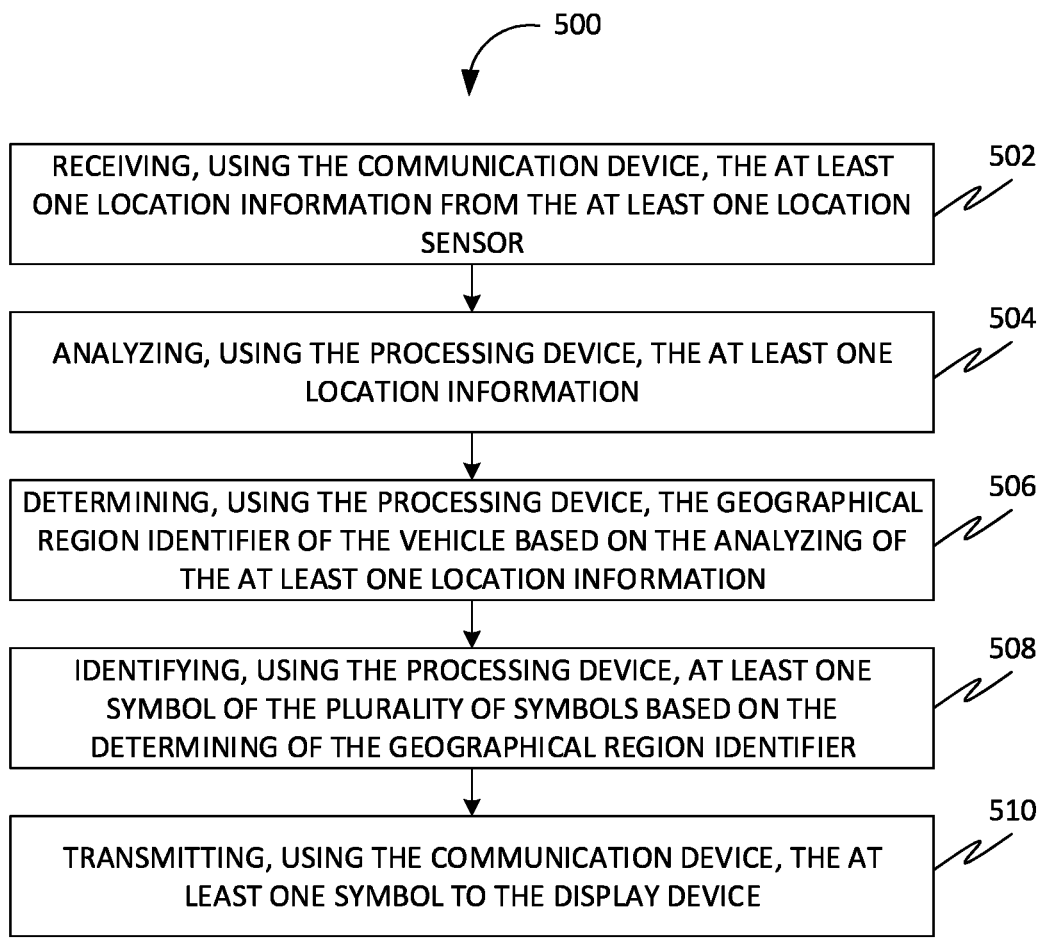
FIG. 5 is a flowchart of a method for identifying at least one symbol for facilitating the licensing of the vehicle, in accordance with some embodiments.

FIG. 5 is a flowchart of a method 500 for identifying at least one symbol for facilitating the licensing of the vehicle, in accordance with some embodiments. Accordingly, the license plate may include at least one location sensor configured for generating at least one location information associated with a geographical location of the vehicle. Further, at 502, the method 500 may include receiving, using the communication device, the at least one location information from the at least one location sensor.

Further, at 504, the method 500 may include a step of analyzing, using the processing device, the at least one location information.

Further, at 506, the method 500 may include a step of determining, using the processing device, the geographical region identifier of the vehicle based on the analyzing of the at least one location information.

Further, at 508, the method 500 may include a step of identifying, using the processing device, the at least one symbol of the plurality of symbols based on the determining of the geographical region identifier. Further, the at least one symbol visually represents the geographical region identifier.

Further, at 510, the method 500 may include a step of transmitting, using the communication device, the at least one symbol to the display device. Further, the display device may be configured for displaying the at least one symbol.

Figure 6:
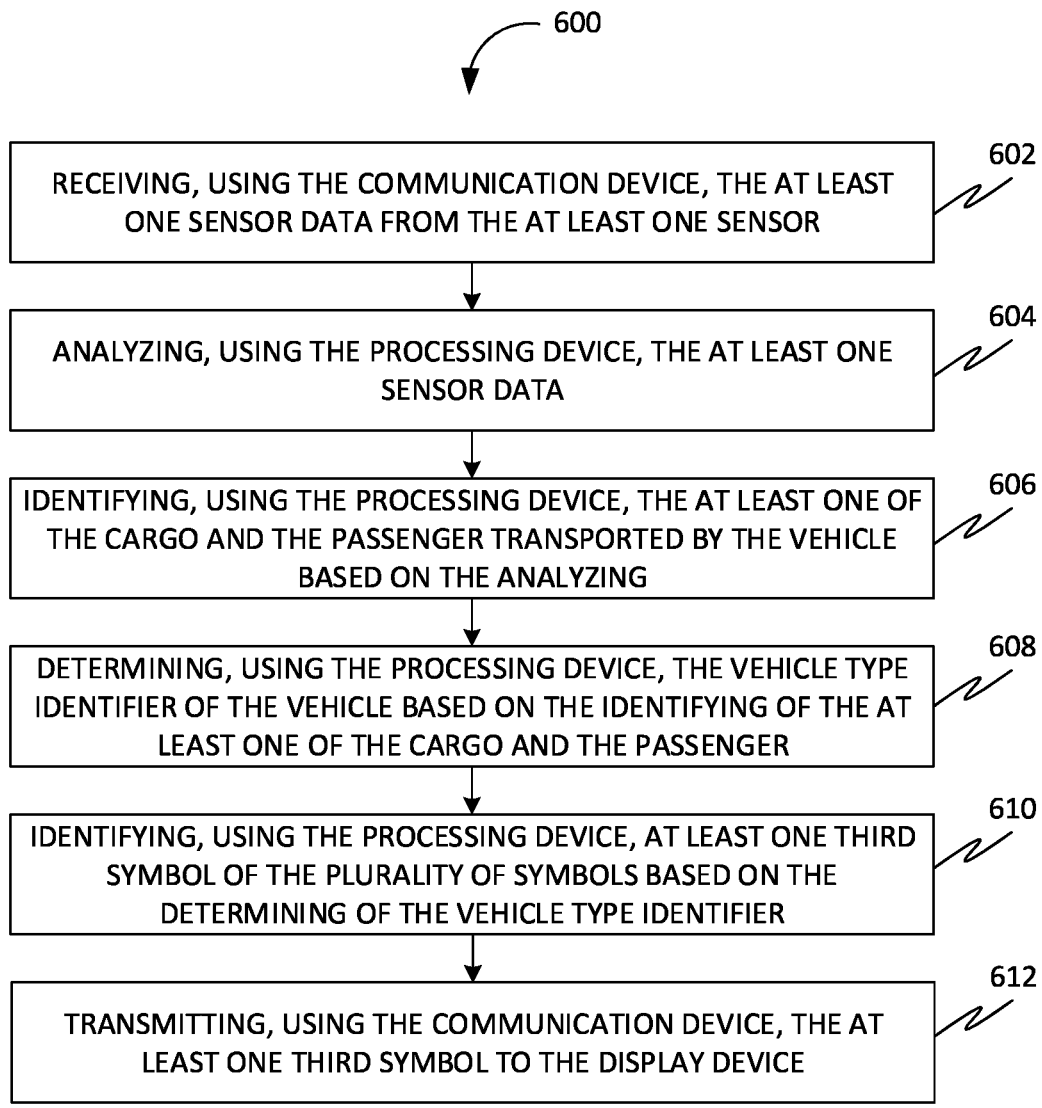
FIG. 6 is a flowchart of a method for identifying at least one third symbol for facilitating the licensing of the vehicle, in accordance with some embodiments.

FIG. 6 is a flowchart of a method 600 for identifying at least one third symbol for facilitating the licensing of the vehicle, in accordance with some embodiments. Accordingly, the license plate may include at least one sensor configured for generating at least one sensor data associated with at least one of a cargo and a passenger transported by the vehicle. Further, at 602, the method 600 may include receiving, using the communication device, the at least one sensor data from the at least one sensor.

Further, at 604, the method 600 may include a step of analyzing, using the processing device, the at least one sensor data.

Further, at 606, the method 600 may include a step of identifying, using the processing device, the at least one of the cargo and the passenger transported by the vehicle based on the analyzing.

Further, at 608, the method 600 may include a step of determining, using the processing device, the vehicle type identifier of the vehicle based on the identifying of the at least one of the cargo and the passenger.

Further, at 610, the method 600 may include a step of identifying, using the processing device, the at least one third symbol of the plurality of symbols based on the determining of the vehicle type identifier. Further, the at least one third symbol visually represents the vehicle type identifier.

Further, at 612, the method 600 may include a step of transmitting, using the communication device, the at least one third symbol to the display device. Further, the display device may be configured for displaying the at least one third symbol.

Figure 7:
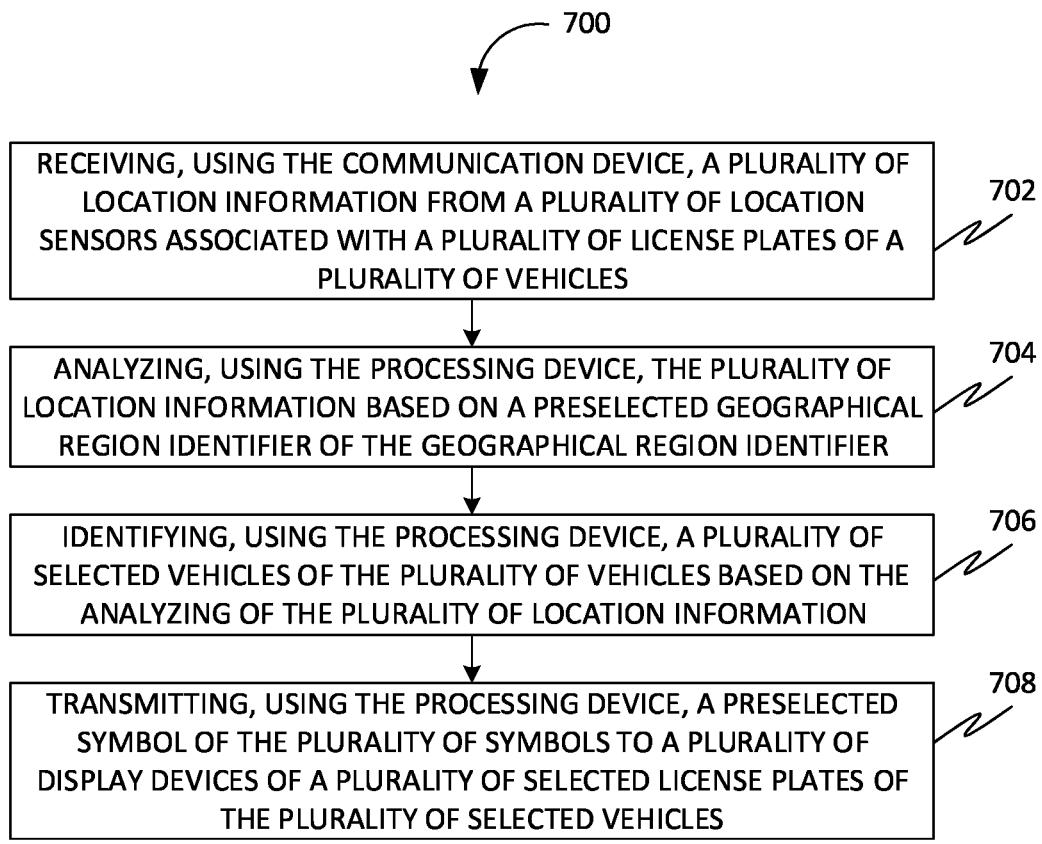
FIG. 7 is a flowchart of a method for transmitting a preselected symbol for facilitating the licensing of the vehicle, in accordance with some embodiments.

FIG. 7 is a flowchart of a method 700 for transmitting a preselected symbol for facilitating the licensing of the vehicle, in accordance with some embodiments. Accordingly, at 702, the method 700 may include a step of receiving, using the communication device, a plurality of location information from a plurality of location sensors associated with a plurality of license plates of a plurality of vehicles.

Further, at 704, the method 700 may include a step of analyzing, using the processing device, the plurality of location information based on a preselected geographical region identifier of the geographical region identifier.

Further, at 706, the method 700 may include a step of identifying, using the processing device, a plurality of selected vehicles of the plurality of vehicles based on the analyzing of the plurality of location information.

Further, at 708, the method 700 may include a step of transmitting, using the processing device, the preselected symbol of the plurality of symbols to a plurality of display devices of a plurality of selected license plates of the plurality of selected vehicles. Further, the plurality of display devices may be configured for displaying the preselected symbol. Further, the predetermined symbol may include an attractive background that may promote tourism, endangered animals, universities, companies, political parties, military positions, and other events.

Figure 8:
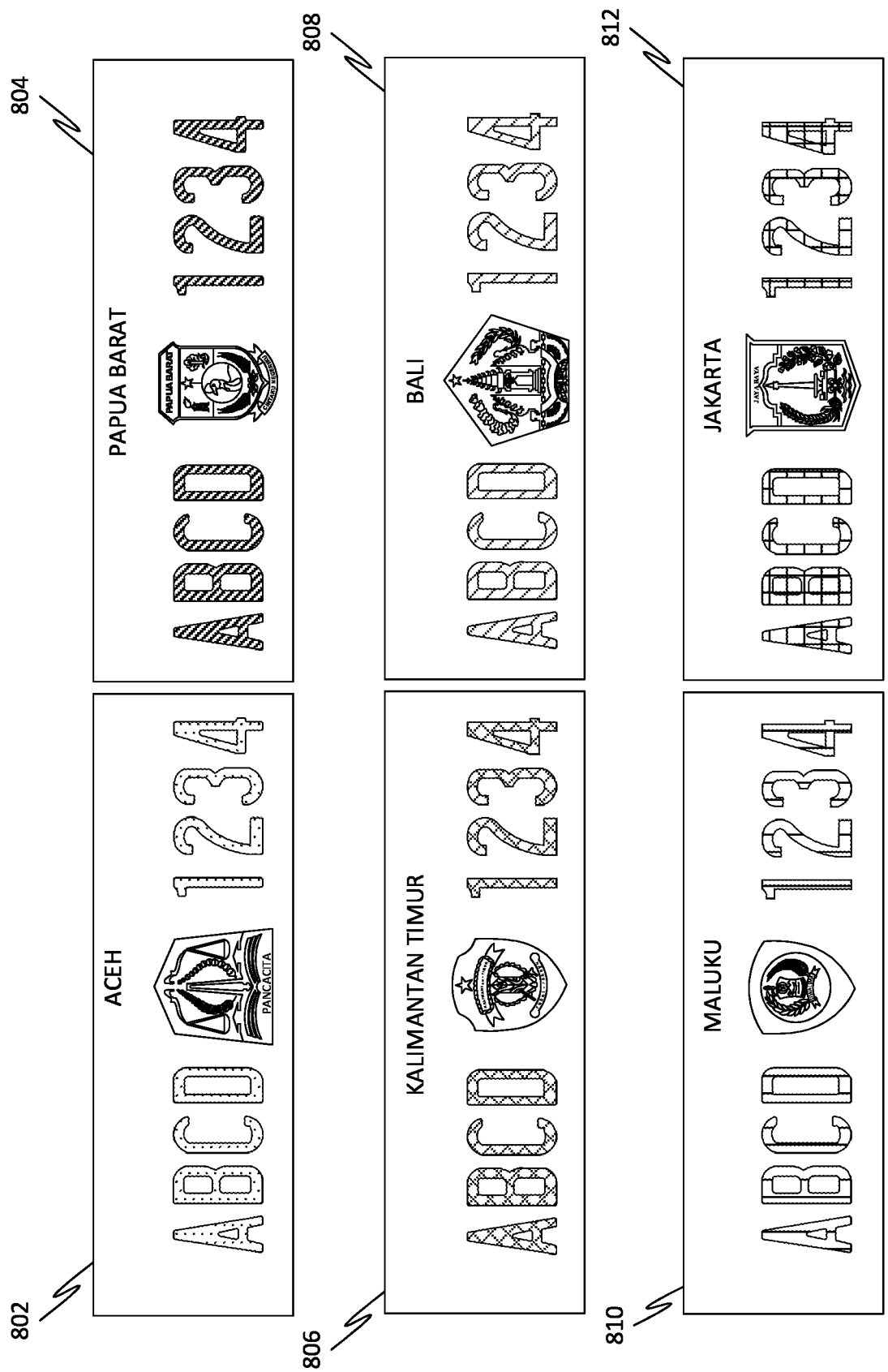
FIG. 8 illustrates a plurality of license plates associated with private vehicles, in accordance with some embodiments.

FIG. 8 illustrates a plurality of license plates 802-812 associated with private vehicles, in accordance with some embodiments. Accordingly, each type of vehicle may be defined by a combination of a specific number and letter. Further, the specific number and the letter combination may be defined by the arrangement of the specific numbers, the letters, and the number of numbers and letters. Further, a license plate of the plurality of license plates 802-812 associated with a private vehicle may include four letters followed by four numbers. Further, the plurality of license plates 802-812 may be associated with the private vehicle corresponding to a region. Further, a license plate 802 of the plurality of license plates 802-812 may be associated with the Aceh region of Indonesia. Further, a license plate 804 of the plurality of license plates 802-812 may be associated with the Papua Barat region of Indonesia. Further, a license plate 806 of the plurality of license plates 802-812 may be associated with the Kalimantan Timur region of Indonesia. Further, a license plate 808 of the plurality of license plates 802-812 may be associated with the Bali region of Indonesia. Further, a license plate 810 of the plurality of license plates 802-812 may be associated with the Maluku region of Indonesia. Further, a license plate 812 of the plurality of license plates 802-812 may be associated with the Jakarta region of Indonesia.

Figure 9:
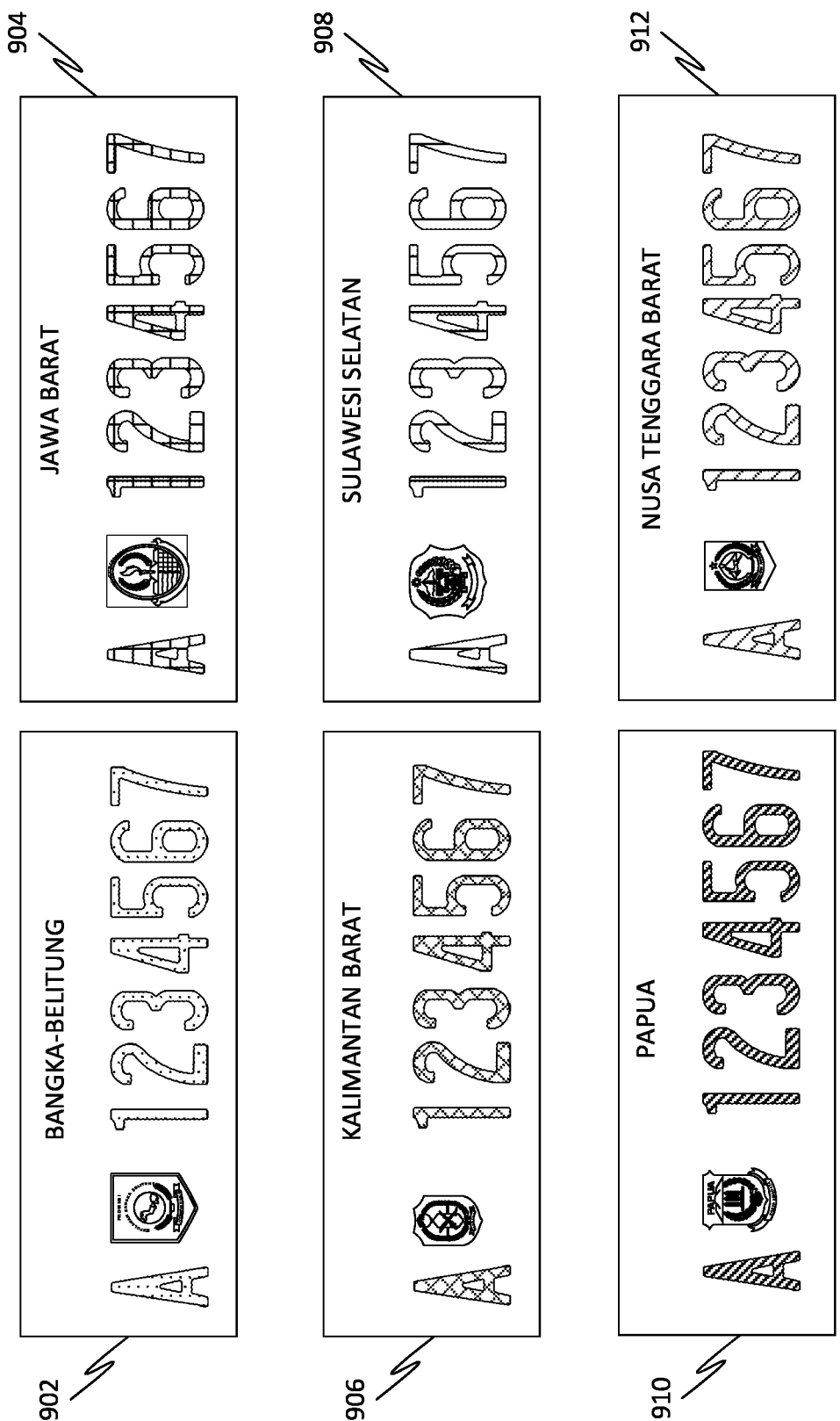
FIG. 9 illustrates a plurality of license plates, in accordance with some embodiments.

FIG. 9 illustrates a plurality of license plates 902-912, in accordance with some embodiments. Accordingly, each plate of the plurality of license plates 902-912 may be associated with a commercial vehicle. Further, the each plate of the plurality of license plates 902-912 may include one letter followed by seven numbers. Further, a license plate 902 of the plurality of license plates 902-912 may be associated with the Bangka-Belitung region of Indonesia. Further, a license plate 904 of the plurality of license plates 902-912 may be associated with the Jawa-Barat region of Indonesia. Further, a license plate 906 of the plurality of license plates 902-912 may be associated with the Kalimantan Barat region of Indonesia. Further, a license plate 908 of the plurality of license plates 902-912 may be associated with the Sulawesi Selatan region of Indonesia. Further, a license plate 910 of the plurality of license plates 902-912 may be associated with the Papua region of Indonesia. Further, a license plate 912 of the plurality of license plates 902-912 may be associated with the Nusa Tenggara Barat region of Indonesia.

Figure 10:
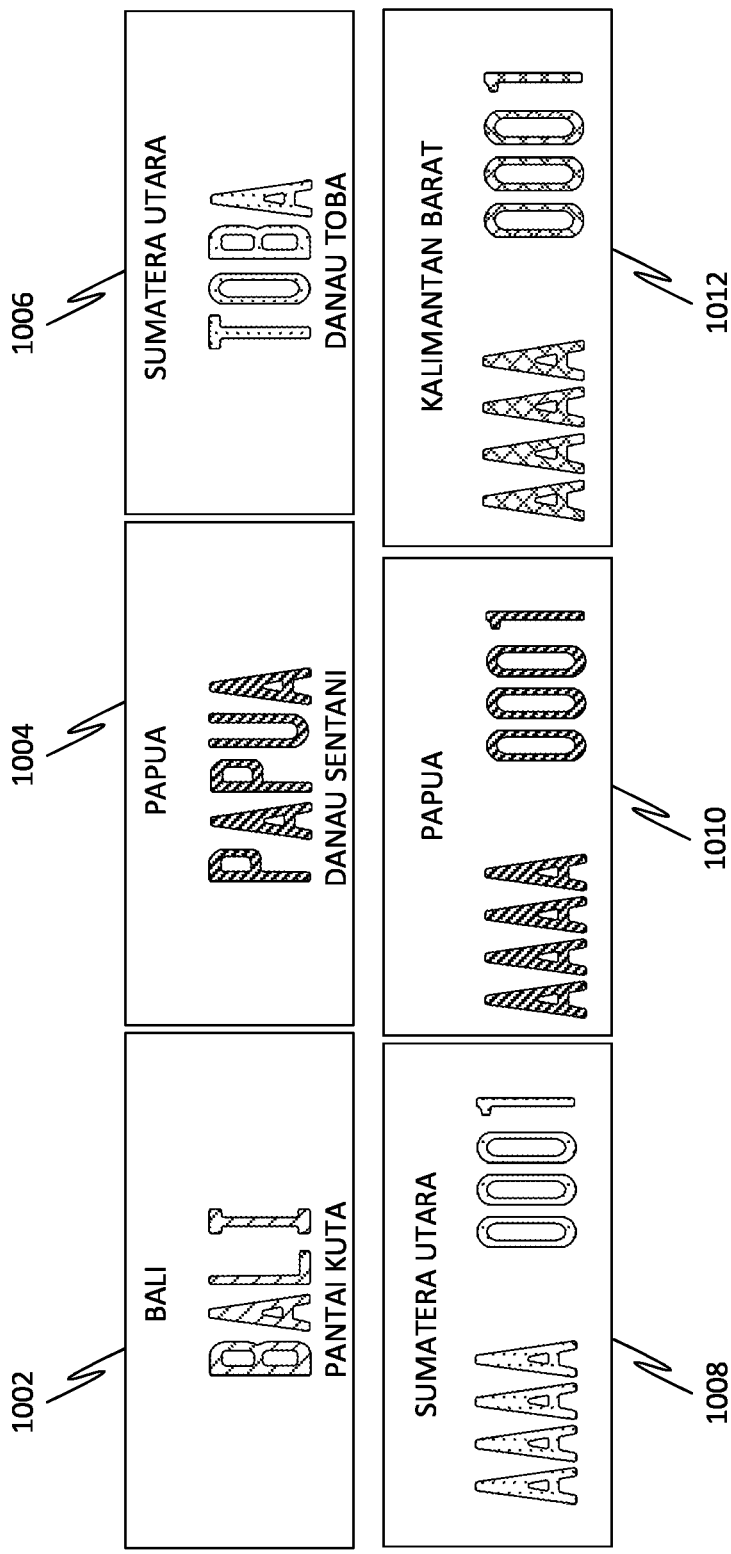
FIG. 10 illustrates a plurality of license plates, in accordance with some embodiments.

FIG. 10 illustrates a plurality of license plates 1002-1012, in accordance with some embodiments. Accordingly, a background color and logo of each license plate of the plurality of license plates 1002-1012 may promote tourism, culture, raise awareness for endangered animals, represent schools of current or past attendance, represent military status, and promote companies. Further, the background may present an image that represents the topological aspects of a region. Further, a license plate 1006 of the plurality of license plates 1002-1012 may include an image of Toba Lake of the North Sumatera region. Further, a license plate 1002 of the plurality of license plates 1002-1012 may include an image of Kuta Beach of the Bali region. Further, a license plate 1008 of the plurality of license plates 1002-1012 may include an image of the Sumateran tiger. Further, a license plate 1010 of the plurality of license plates 1002-1012 may include an image of Papua cendrawasih bird. Further, a license plate 1012 of the plurality of license plates 1002-1012 may include an image of Orangutan Kalimantan. Further, a license plate 1004 of the plurality of license plates 1002-1012 may include an image of Lake Sentani. Further, the background of the plurality of license plates 1002-1012 may include an image of Bunaken of the North Sulawesi region. Further, the background may feature an aspect of the culture of batik Indonesia, the Kecak dance, the Pendet dance, and the dance of the kipas, and so on. The backgrounds may feature topological aspects of a region and endangered animals.

Figure 11:
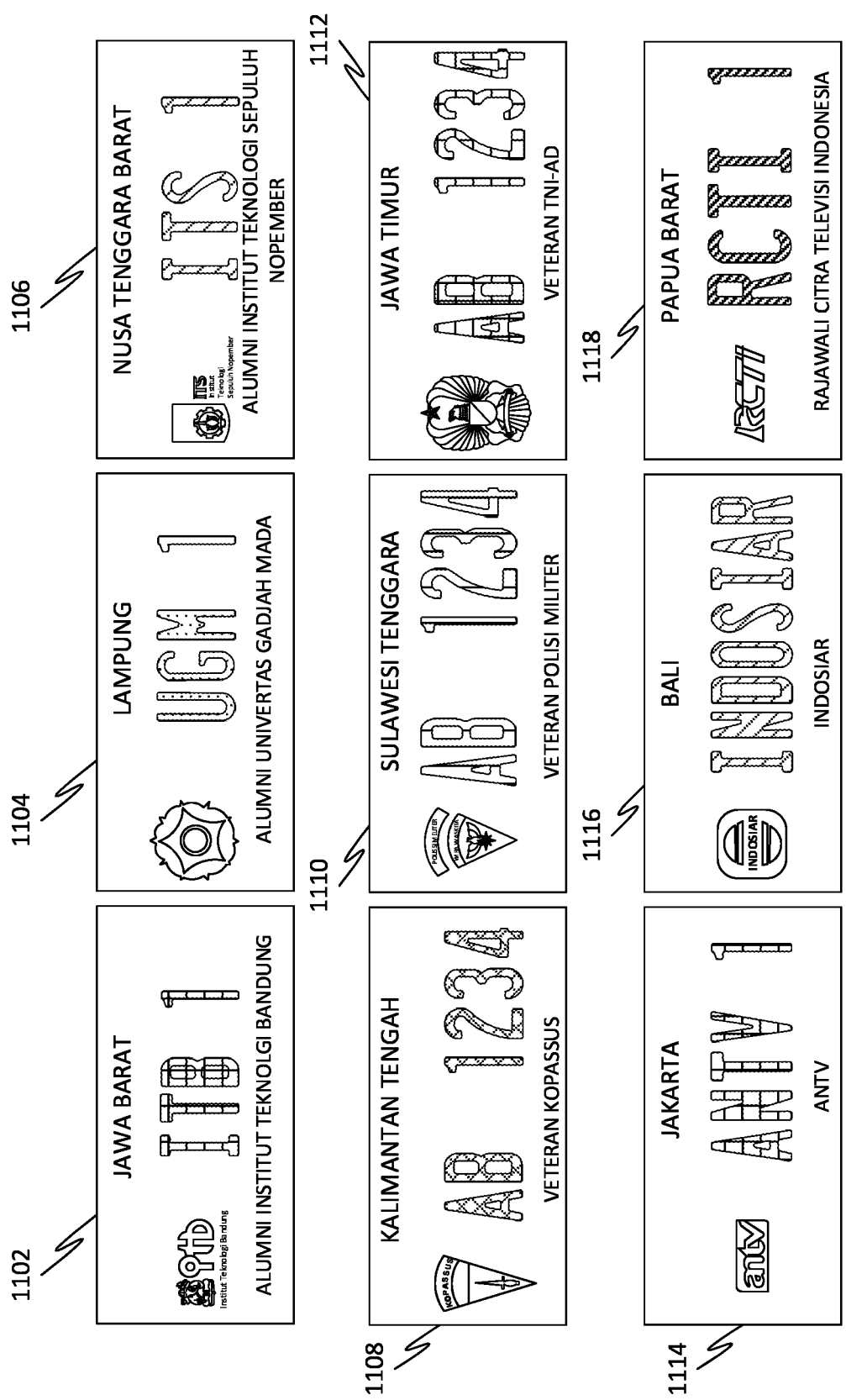
FIG. 11 illustrates a plurality of license plates, in accordance with some embodiments.

FIG. 11 illustrates a plurality of license plates 1102-1118, in accordance with some embodiments. Accordingly, a logo associated with a license plate of the plurality of license plates 1102-1118 may represent a university, institute, or college. Further, a logo associated with a license plate 1102 of the plurality of license plates 1102-1118 may represent university ITB. Further, a logo associated with a license plate 1104 of the plurality of license plates 1102-1118 may represent UGM. Further, a logo associated with a license plate 1106 of the plurality of license plates 1102-1118 may represent ITS. Further, the logo associated with a plate of a plurality of license plates 1108-1112 may represent the military status, retirement status, navy status, air force status, policemen status, marine status, red beret status, and orange beret status, and so on. Further, a logo associated with a license plate 1108 of the plurality of license plates 1102-1118 may represent veteran status. Further, a logo associated with a license plate 1110 of the plurality of license plates 1102-1118 may represent a military police veteran. Further, a logo associated with a license plate 1112 of the plurality of license plates 1102-1118 may represent veteran tni-ad. Further, a logo of a license plate 1114 of the plurality of license plates 1102-1118 may represent a television broadcasting company (such as ANTV). Further, a logo of a license plate 1116 of the plurality of license plates 1102-1118 may represent a television broadcasting company (such as INDOSIAR). Further, a logo of a license plate 1118 of the plurality of license plates 1102-1118 may represent a television broadcasting company (such as Rajawali Citra Televisi Indonesia—RCTI).

Figure 12:
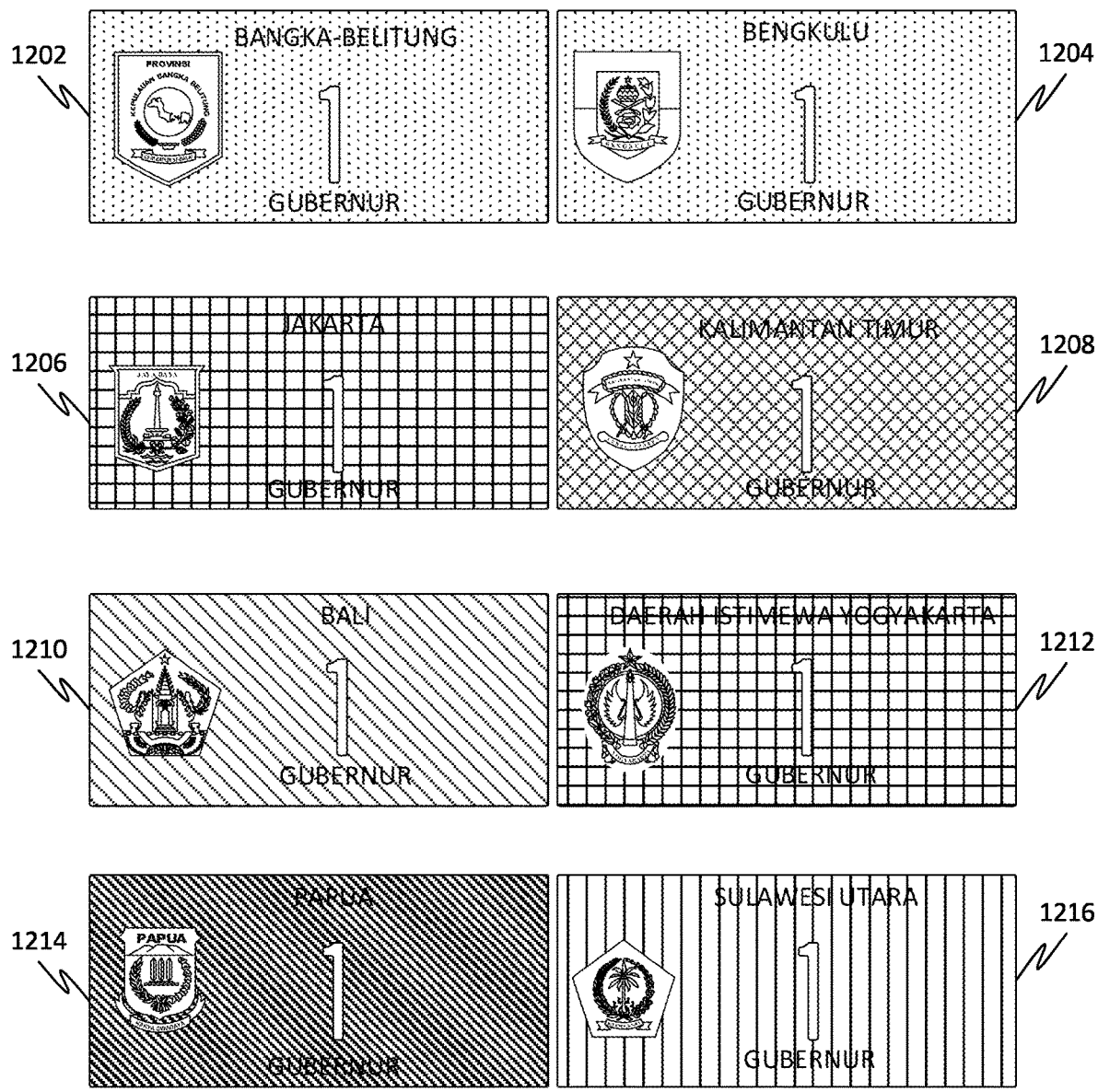
FIG. 12 illustrates a plurality of license plates corresponding to a region of Indonesia, in accordance with some embodiments.

FIG. 12 illustrates a plurality of license plates 1202-1216 corresponding to a region of Indonesia, in accordance with some embodiments. Accordingly, the plurality of license plates 1202-1216 associated with a local government vehicle may include one number. Further, a number "1" may represent a governor. Further, a license plate 1202 of the plurality of license plates 1202-1216 may be associated with a governor of Bangka-Belitung. Further, a license plate 1204 of the plurality of license plates 1202-1216 may be associated with a governor of Bengkulu. Further, a license plate 1206 of the plurality of license plates 1202-1216 may be associated with a governor of Jakarta. Further, a license plate 1208 of the plurality of license plates 1202-1216 may be associated with a governor of Kalimantan Timur. Further, a license plate 1210 of the plurality of license plates 1202-1216 may be associated with a governor of Bali. Further, a license plate 1212 of the plurality of license plates 1202-1216 may be associated with a governor of Daerah-Istimewa Yogyakarta. Further, a license plate 1214 of the plurality of license plates 1202-1216 may be associated with a governor of Papua. Further, a license plate 1216 of the plurality of license plates 1202-1216 may be associated with a governor of Sulawesi Utara.

Figure 13:
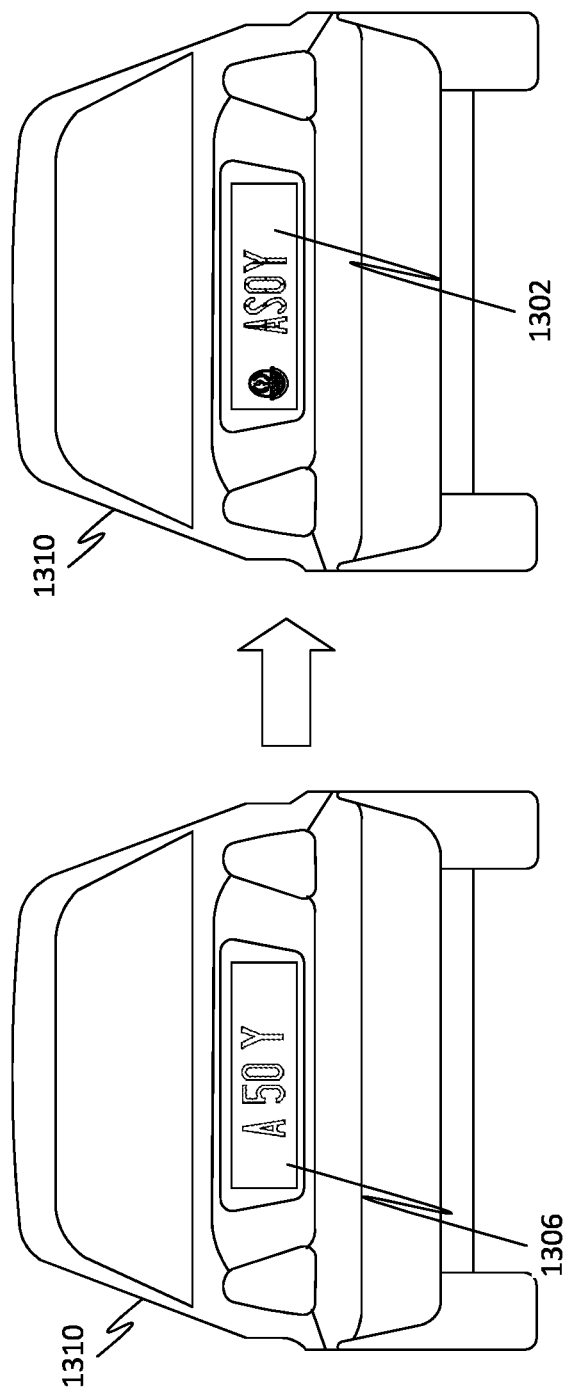
FIG. 13 illustrates an existing license plate being replaced by a disclosed license plate, in accordance with some embodiments.

FIG. 13 illustrates an existing license plate 1306 being replaced by a disclosed license plate 1302, in accordance with some embodiments. Accordingly, the existing license plate 1306 and the disclosed license plate 1302 may be associated with a special interest vehicle 1310. Further, the disclosed license plate 1302 may include one or more letters.

Figure 14:
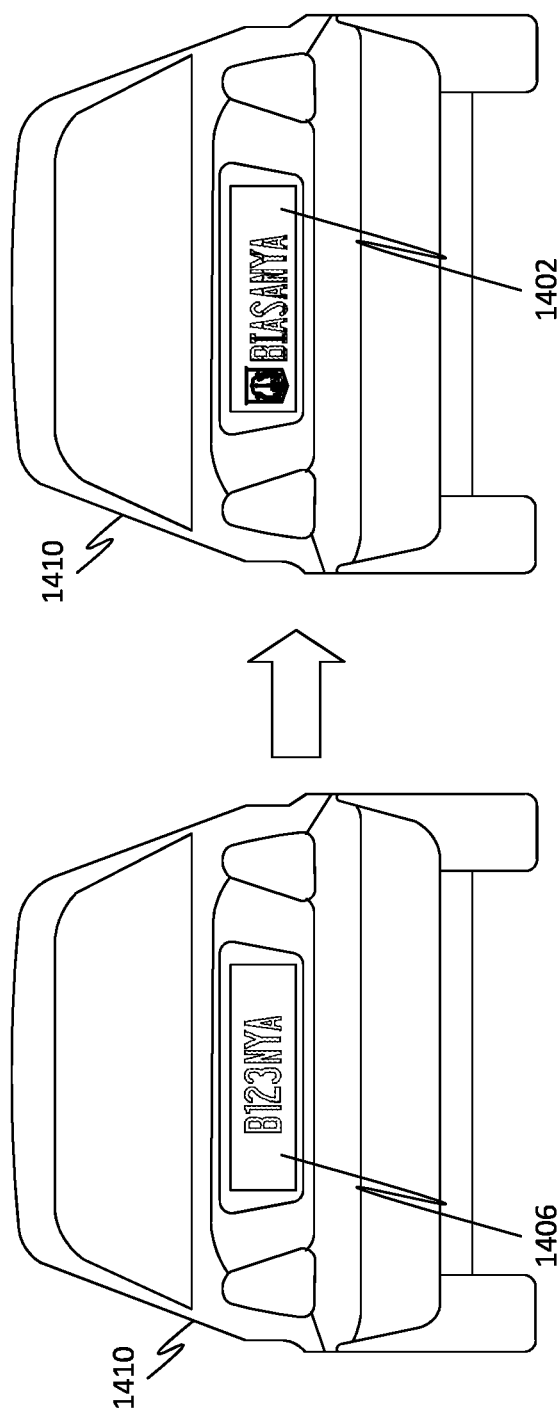
FIG. 14 illustrates an existing license plate being replaced by a disclosed license plate, in accordance with some embodiments.

FIG. 14 illustrates an existing license plate 1406 being replaced by a disclosed license plate 1402, in accordance with some embodiments. Accordingly, the existing license plate 1406 and the disclosed license plate 1402 may be associated with a special interest vehicle 1410. Further, the disclosed license plate 1402 may include one or more letters.

Figure 15:
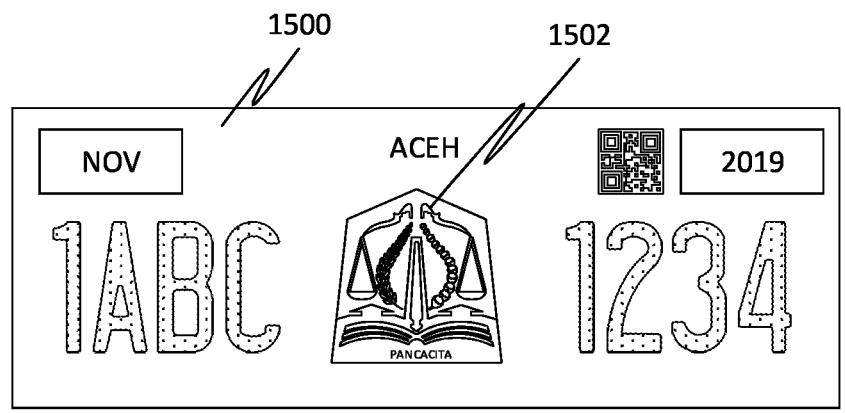
FIG. 15 illustrates a license plate associated with the Aceh province of Indonesia, in accordance with some embodiments.

FIG. 15 illustrates a license plate 1500 associated with the Aceh province of Indonesia, in accordance with some embodiments. Accordingly, the license plate 1500 may include a logo 1502 associated with the Aceh province of Indonesia.

Figure 16:
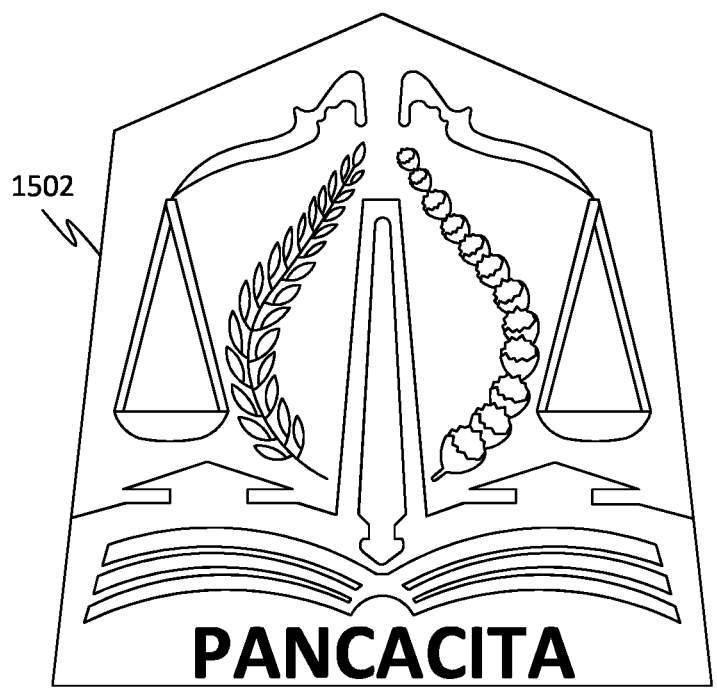
FIG. 16 illustrates the logo associated with the Aceh province of Indonesia, in accordance with some embodiments.

FIG. 16 illustrates the logo 1502 associated with the Aceh province of Indonesia, in accordance with some embodiments.

Figure 17:
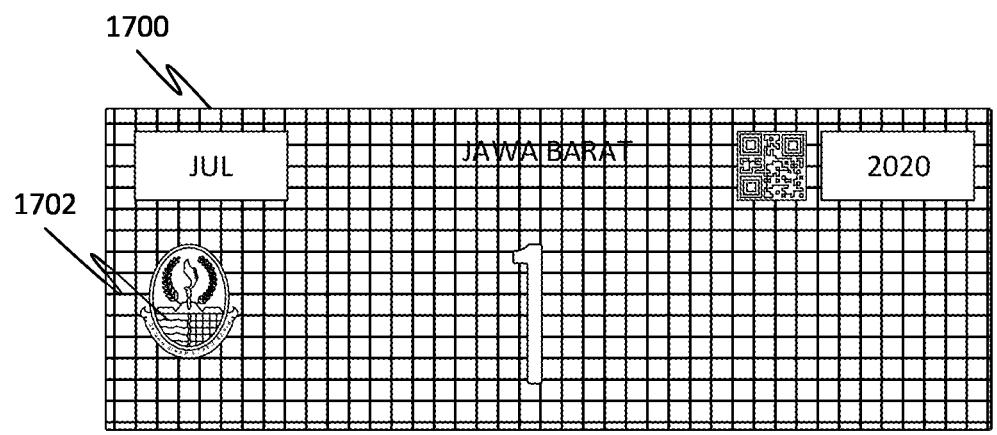
FIG. 17 illustrates a license plate associated with the Jawa Barat province of Indonesia, in accordance with some embodiments.

FIG. 17 illustrates a license plate 1700 associated with the Jawa Barat province of Indonesia, in accordance with some embodiments. Accordingly, the license plate 1700 may include a logo 1702 associated with the Jawa Barat (west of Java) province of Indonesia.

Figure 18:
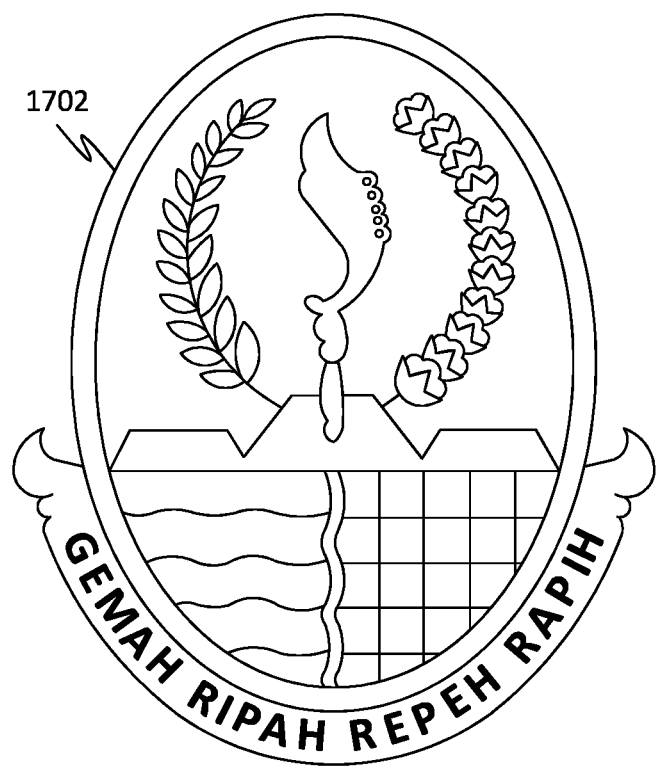
FIG. 18 illustrates the logo associated with the Jawa Barat province of Indonesia, in accordance with some embodiments.

FIG. 18 illustrates the logo 1702 associated with the Jawa Barat province of Indonesia, in accordance with some embodiments.

Figure 19:
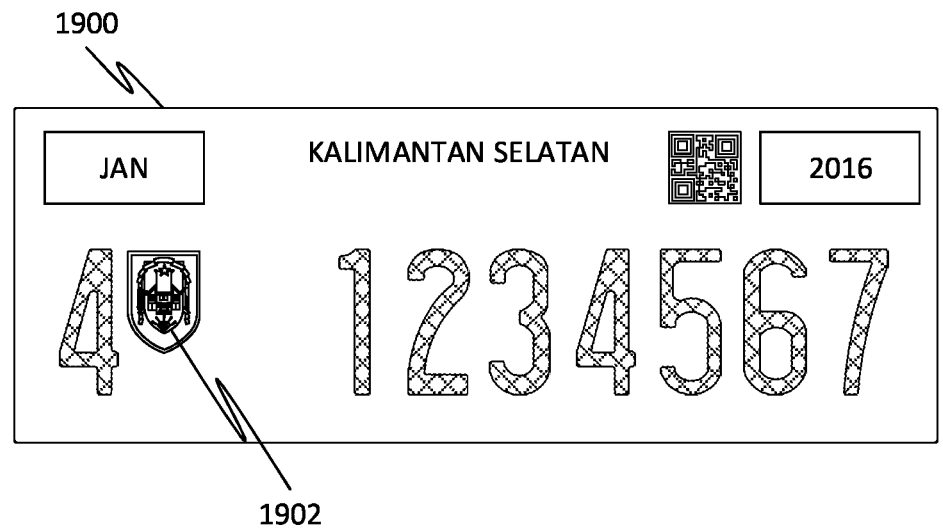
FIG. 19 illustrates a license plate associated with the Kalimantan Selatan province of Indonesia, in accordance with some embodiments.

FIG. 19 illustrates a license plate 1900 associated with the Kalimantan Selatan province of Indonesia, in accordance with some embodiments. Accordingly, the license plate 1900 may include a logo 1902 associated with the Kalimantan Selatan (south of Kalimantan) province of Indonesia.

Figure 20:
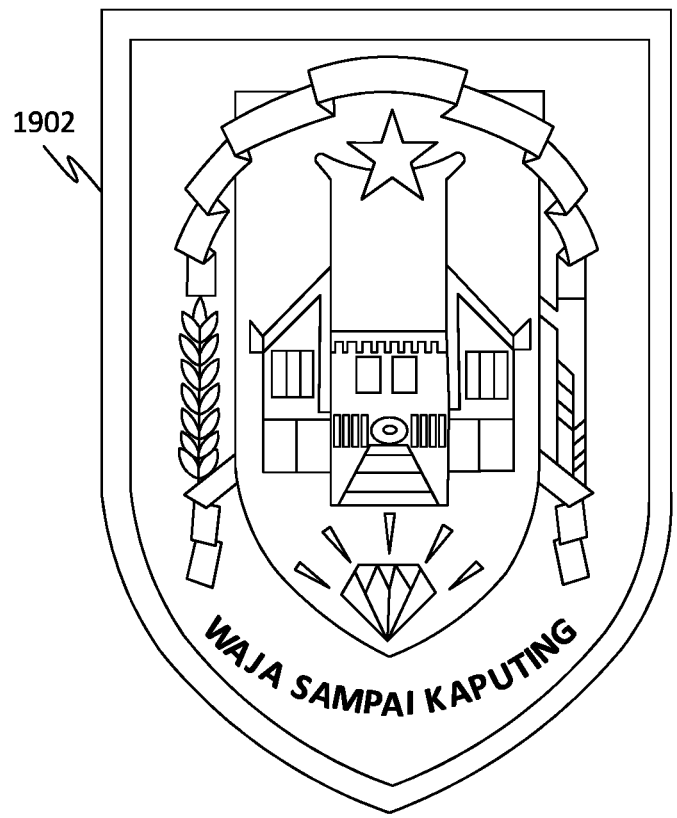
FIG. 20 illustrates the logo associated with the Kalimantan Selatan province of Indonesia, in accordance with some embodiments.

FIG. 20 illustrates the logo 1902 associated with the Kalimantan Selatan province of Indonesia, in accordance with some embodiments.

Figure 21:
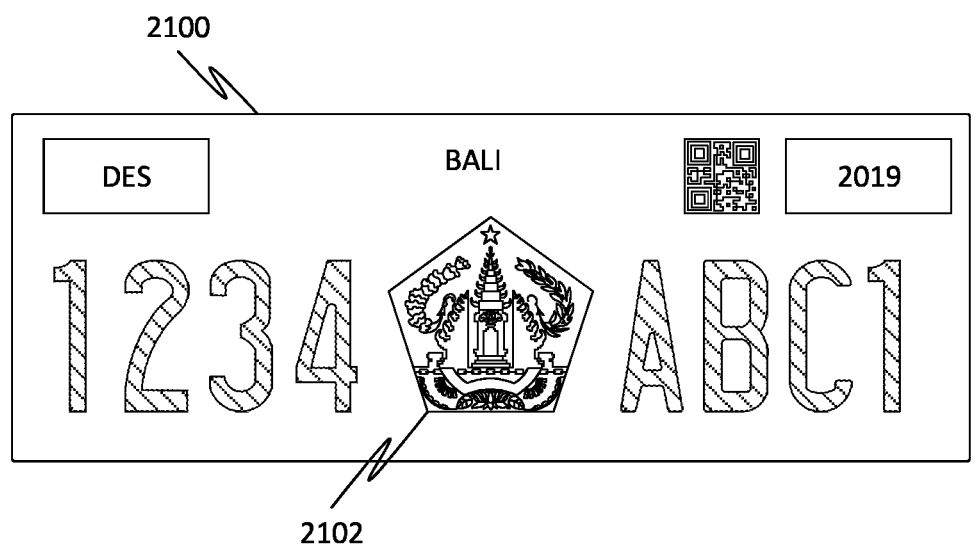
FIG. 21 illustrates a license plate associated with the Bali province of Indonesia, in accordance with some embodiments.

FIG. 21 illustrates a license plate 2100 associated with the Bali province of Indonesia, in accordance with some embodiments. Accordingly, the license plate 2100 may include a logo 2102 associated with the Bali province of Indonesia.

Figure 22:
FIG. 22 illustrates the logo associated with the Bali province of Indonesia, in accordance with some embodiments.

FIG. 22 illustrates the logo 2102 associated with the Bali province of Indonesia, in accordance with some embodiments.

Figure 23:
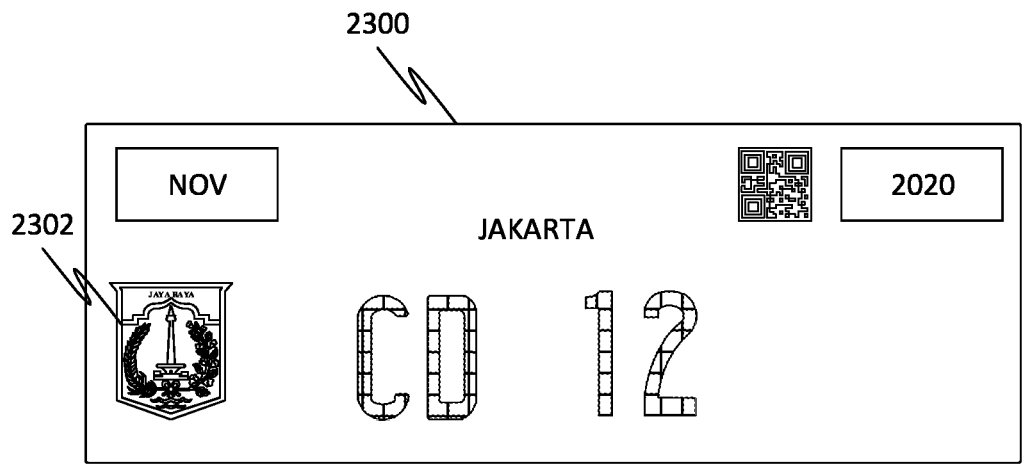
FIG. 23 illustrates a license plate associated with the Jakarta province of Indonesia, in accordance with some embodiments.

FIG. 23 illustrates a license plate 2300 associated with the Jakarta province of Indonesia, in accordance with some embodiments. Accordingly, the license plate 2300 may include a logo 2302 associated with the Jakarta province of Indonesia.

Figure 24:
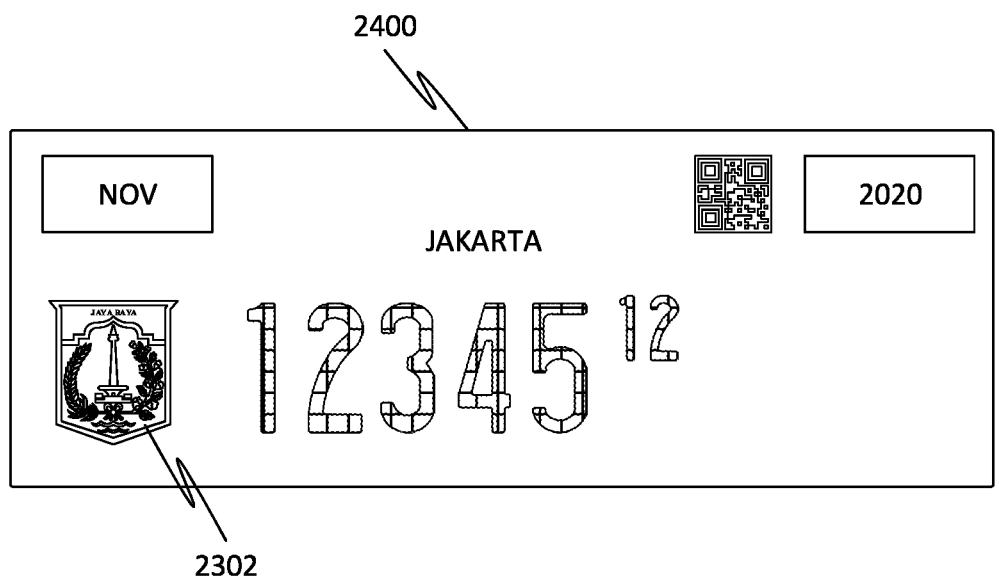
FIG. 24 illustrates a license plate associated with the Jakarta province of Indonesia, in accordance with some embodiments.

FIG. 24 illustrates a license plate 2400 associated with the Jakarta province of Indonesia, in accordance with some embodiments. Accordingly, the license plate 2400 may include the logo 2302 associated with the Jakarta province of Indonesia.

Figure 25:
FIG. 25 illustrates the logo associated with the Jakarta province of Indonesia, in accordance with some embodiments.

FIG. 25 illustrates the logo 2302 associated with the Jakarta province of Indonesia, in accordance with some embodiments.

Figure 26:
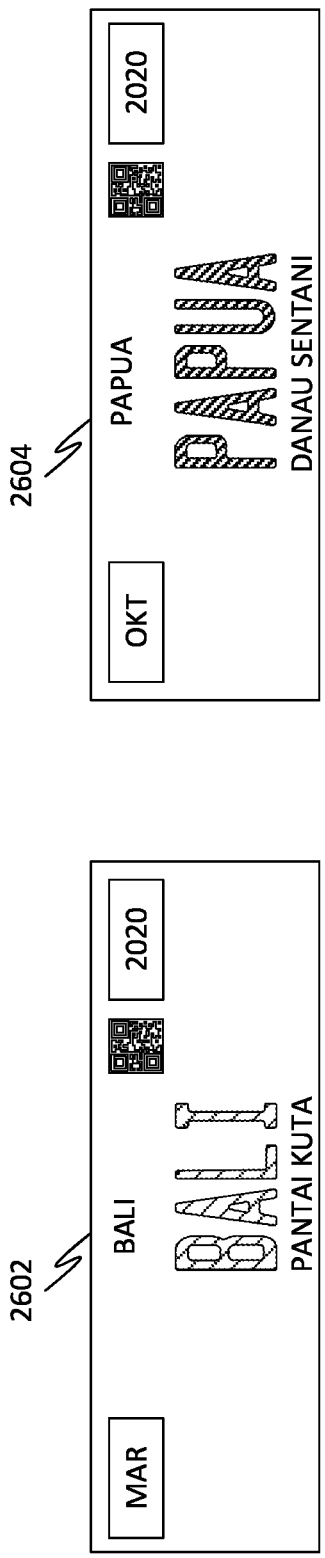
FIG. 26 illustrates a plurality of license plates, in accordance with some embodiments.

FIG. 26 illustrates a plurality of license plates 2602-2604, in accordance with some embodiments. Accordingly, a license plate 2602 of the plurality of license plates 2602-2604 may be associated with the Bali province of Indonesia. Further, a license plate 2604 of the plurality of license plates 2602-2604 may be associated with the Papua province of Indonesia.

FIG. 27 is a block diagram of the system 200 for facilitating the licensing of the vehicle, in accordance with some embodiments.

Figure 28:
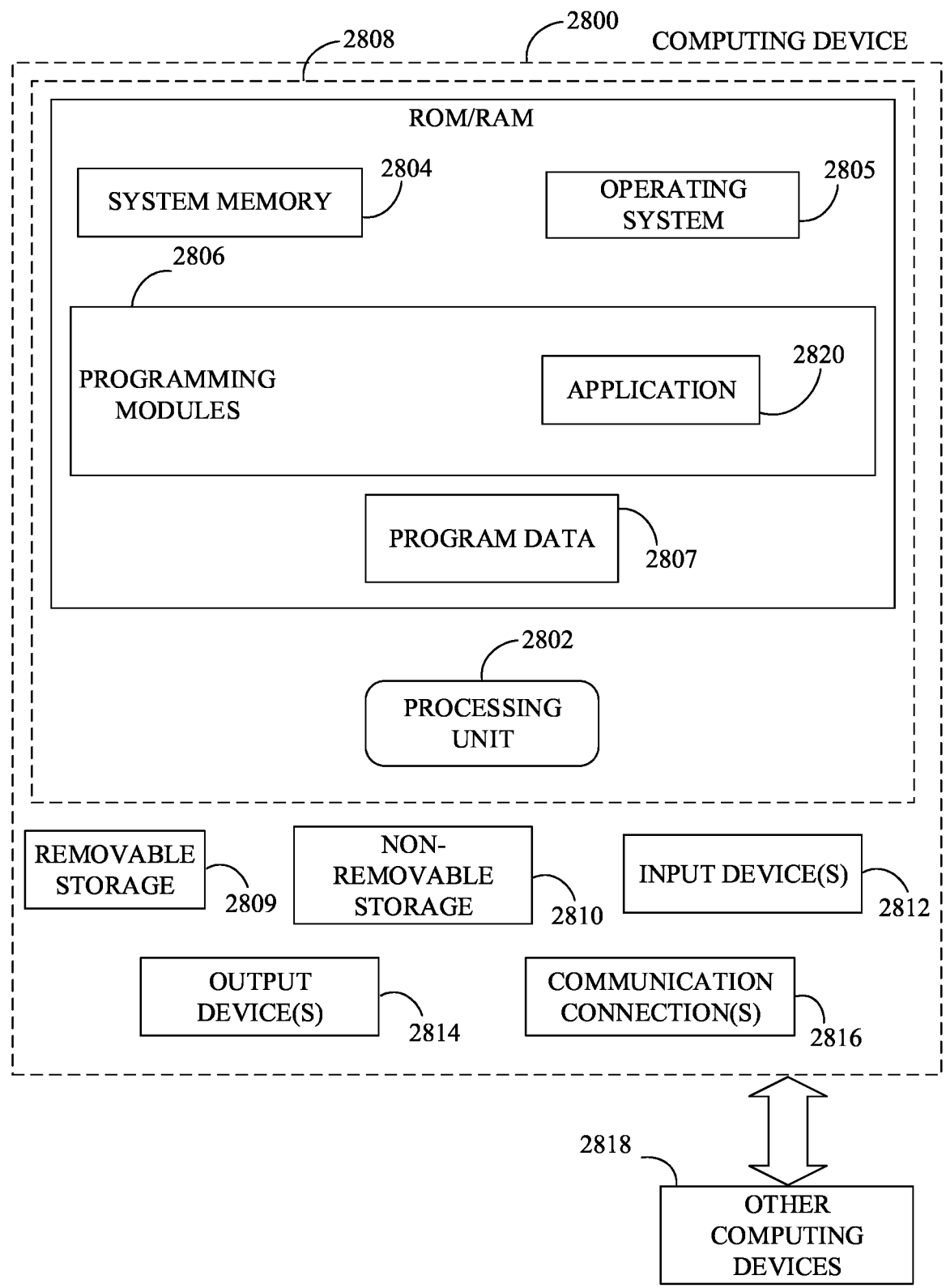
FIG. 28 is a block diagram of a computing device for implementing the methods disclosed herein, in accordance with some embodiments.

With reference to FIG. 28, a system consistent with an embodiment of the disclosure may include a computing device or cloud service, such as computing device 2800. In a basic configuration, computing device 2800 may include at least one processing unit 2802 and a system memory 2804. Depending on the configuration and type of computing device, system memory 2804 may comprise, but is not limited to, volatile (e.g. random-access memory (RAM)), non-volatile (e.g. read-only memory (ROM)), flash memory, or any combination. System memory 2804 may include operating system 2805, one or more programming modules 2806, and may include a program data 2807. Operating system 2805, for example, may be suitable for controlling computing device 2800's operation. In one embodiment, programming modules 2806 may include image-processing module, machine learning module. Furthermore, embodiments of the disclosure may be practiced in conjunction with a graphics library, other operating systems, or any other application program and is not limited to any particular application or system. This basic configuration is illustrated in FIG. 28 by those components within a dashed line 2808.

Computing device 2800 may have additional features or functionality. For example, computing device 2800 may also include additional data storage devices (removable and/or non-removable) such as, for example, magnetic disks, optical disks, or tape. Such additional storage is illustrated in FIG. 28 by a removable storage 2809 and a non-removable storage 2810. Computer storage media may include volatile and non-volatile, removable and non-removable media implemented in any method or technology for storage of information, such as computer-readable instructions, data structures, program modules, or other data. System memory 2804, removable storage 2809, and non-removable storage 2810 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 2800. Any such computer storage media may be part of device 2800. Computing device 2800 may also have input device(s) 2812 such as a keyboard, a mouse, a pen, a sound input device, a touch input device, a location sensor, a camera, a biometric sensor, etc. Output device(s) 2814 such as a display, speakers, a printer, etc. may also be included. The aforementioned devices are examples and others may be used.

Computing device 2800 may also contain a communication connection 2816 that may allow device 2800 to communicate with other computing devices 2818, such as over a network in a distributed computing environment, for example, an intranet or the Internet. Communication connection 2816 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 2804, including operating system 2805. While executing on processing unit 2802, programming modules 2806 (e.g., application 2820) may perform processes including, for example, one or more stages of methods, algorithms, systems, applications, servers, databases as described above. The aforementioned process is an example, and processing unit 2802 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

FIG. 29 is a table 2900 illustrating a coding concept for facilitating the licensing of the vehicle, in accordance with some embodiments. Further, the table 2900 describes a current system for the thirty-four provinces of Indonesia in comparison with a new coding system. Further, the current system may include two coding areas for the North Sumatra province of Indonesia and the new system may include one coding area for the North Sumatra province of Indonesia. Further, the current system may include five coding areas for the West of Java province of Indonesia and the new system may include one coding area for the West of Java province of Indonesia. Further, the current system may include seven coding areas for the Central of Java province of Indonesia and the new system may include one coding area for the Central of Java province of Indonesia. Further, the current system may include eight coding areas for the East of Java province of Indonesia and the new system may include one coding area for the East of Java province of Indonesia. Further, the current system may include two coding areas for the West Nusa Tenggara province of Indonesia and the new system may include one coding area for the West Nusa Tenggara province of Indonesia. Further, the current system may include three coding areas for the East Nusa Tenggara province of Indonesia and the new system may include one coding area for the Nusa Tenggara province of Indonesia. Further, the current system may include twenty-eight coding areas for twenty-eight provinces of Indonesia and the new system may include twenty-eight coding areas for the twenty-eight provinces of Indonesia. Further, a total coding area for the current system may be fifty-five coding areas. Further, a total coding area for the new system may be thirty-four coding areas.

Figure 30:
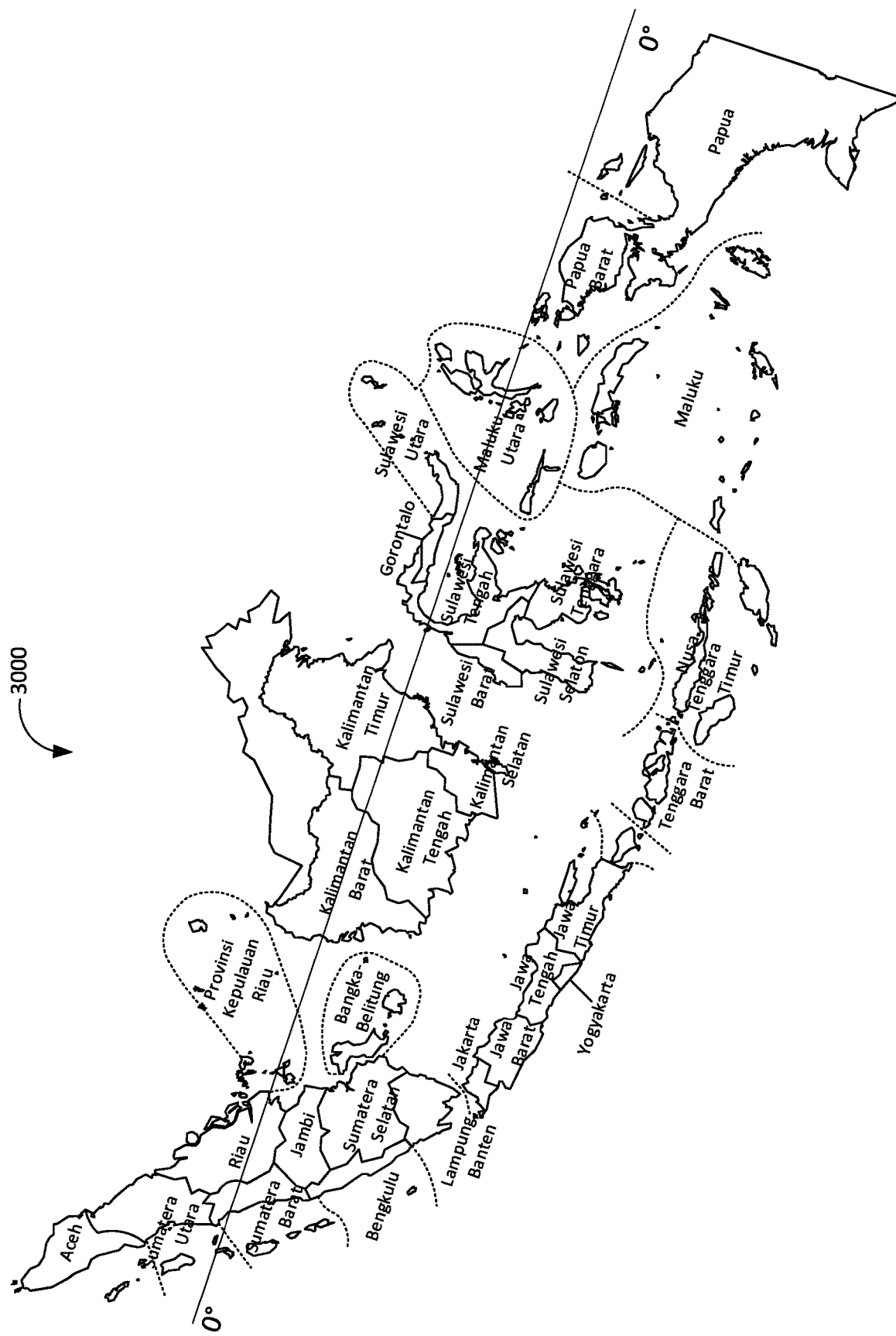
FIG. 30 is a map of Indonesia illustrating a coding concept for facilitating the licensing of the vehicle, in accordance with some embodiments.

FIG. 30 is a map 3000 of Indonesia illustrating a coding concept for facilitating the licensing of the vehicle, in accordance with some embodiments. Further, the map 3000 shows thirty-four provinces of Indonesia. Further, the thirty-four provinces may include North Sumatra province, West of Java province, Central of Java province, East of Java province, West Nusa Tenggara province, East Nusa Tenggara province, etc. Further, each province of the thirty-four provinces corresponds to the geographical region identifier. Further, the geographical region identifier codifies the province. Further, at least one symbol of the plurality of symbols represents the province of the thirty-four provinces. Further, a visual feature of the at least one symbol represents the province of the thirty-four provinces. Further, the at least one symbol may include letters and numerals. Further, the visual feature may include a color of the letters and the numerals. Further, the letters and the numerals of green color represent Sumatra Island. Further, the letters and the numerals of navy blue color represent Java Island. Further, the letters and the numerals of orange color may represent Kalimantan Island. Further, the letters and the numerals of brown color may represent Bali, West Nusa Tenggara, and East Nusa Tenggara. Further, the letters and the numerals of black color represent Sulawesi Island and Mollusca Island. Further, the letters and the numerals of sky blue color may represent Papua Island.

Figure 31:
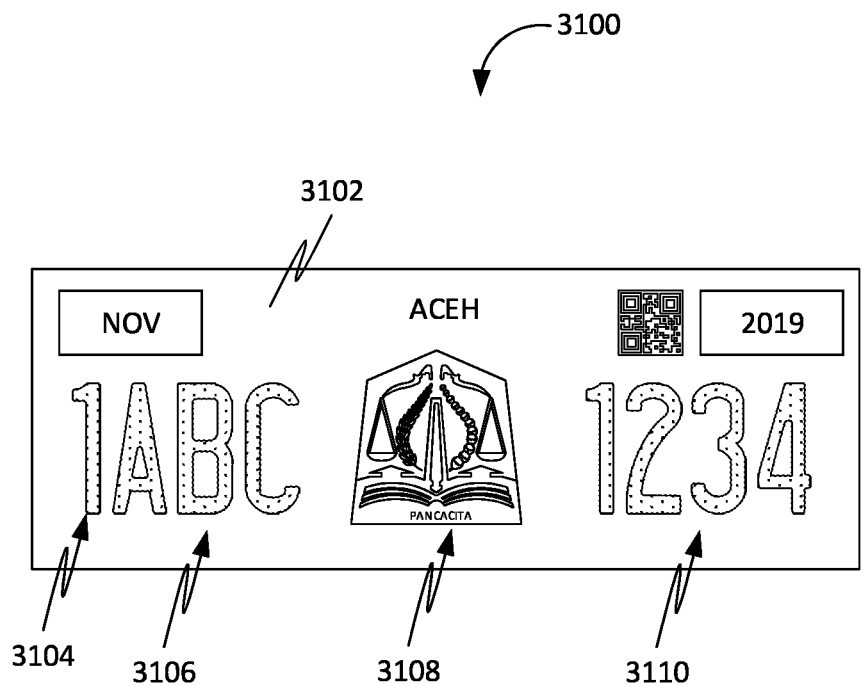
FIG. 31 illustrates a license plate of the vehicle, in accordance with some embodiments.

FIG. 31 illustrates a license plate 3100 of the vehicle, in accordance with some embodiments. Further, the license plate 3100 may include a license plate image 3102. Further, the license plate image 3102 may include the plurality of symbols in at least one format based on at least one of the geographical region identifier and the vehicle type identifier. Further, the at least one format corresponds to at least one arrangement of at least one symbol segment of the plurality of symbols on the license plate image 3102. Further, the license plate image 3102 may be associated with a private vehicle and a four-or-more wheeled vehicle. Further, the private vehicle, the four-or-more wheeled vehicle, etc., may be the vehicle type identifier. Further, the at least one symbol segment may include a first symbol segment 3104, a second symbol segment 3106, a third symbol segment 3108, and a fourth symbol segment 3110. Further, the first symbol segment 3104 may include a single numeral. Further, the single numeral represents the province associated with the vehicle. Further, the second symbol segment 3106 may include three letters in at least one combination of the three letters. Further, the third symbol segment 3108 may include four numerals in at least one combination of the four numerals. Further, the fourth symbol segment 3110 may include a logo associated with the province. Further, the single numeral may be present on a left portion of the license plate image 3102. Further, the three letters may be present on the left portion succeeding the single numeral. Further, the logo may be present on a center portion of the license plate image 3102 succeeding the three letters. Further, the four numerals may present on a right portion of the license plate image 3102 succeeding the logo.

Figure 32:
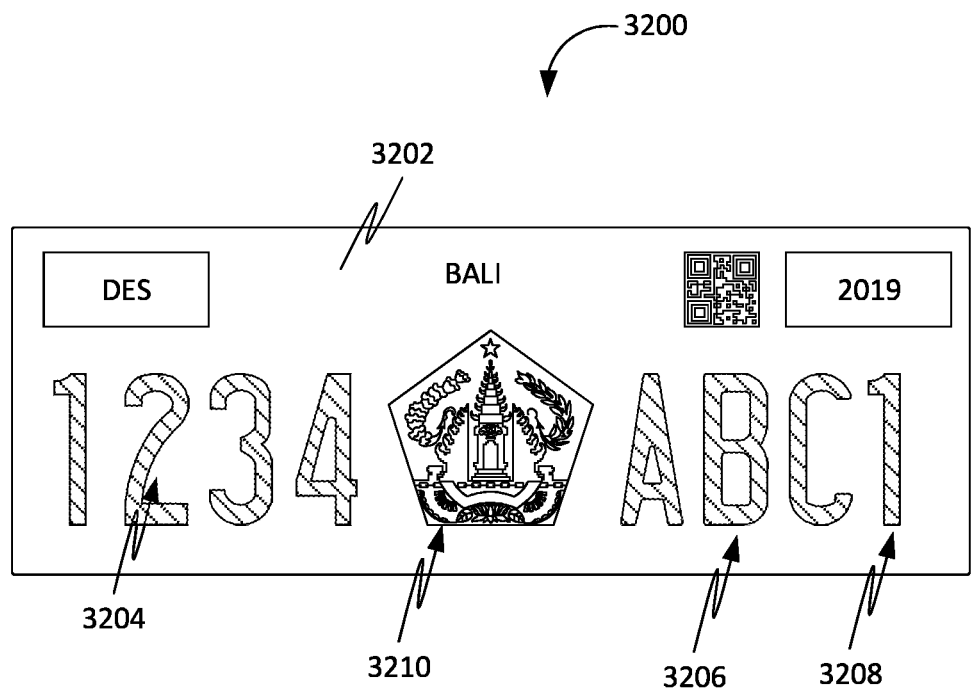
FIG. 32 illustrates a license plate of the vehicle, in accordance with some embodiments.

FIG. 32 illustrates a license plate 3200 of the vehicle, in accordance with some embodiments. Further, the license plate 3200 may include a license plate image 3202. Further, the license plate image 3202 may be associated with a private vehicle and two-wheeled vehicle or three-wheeled vehicle. Further, the private vehicle, the two-wheeled vehicle or the three-wheeled vehicle, etc., may be the vehicle type identifier. Further, the at least one symbol segment may include a first symbol segment 3204, a second symbol segment 3206, a third symbol segment 3208, and a fourth symbol segment 3210. Further, the first symbol segment 3204 may include four numerals in at least one combination of the four numerals. Further, the second symbol segment 3206 may include three letters in at least one combination of the three letters. Further, the third symbol segment 3208 may include a single numeral. Further, the single numeral represents the province associated with the vehicle. Further, the fourth symbol segment 3210 may include a logo associated with the province. Further, the four numerals may be present on a left portion of the license plate image 3202. Further, the logo may be present on a center portion of the license plate image 3202 succeeding the four numerals. Further, the three letters may be present on a right portion of the license plate image 3202 succeeding the logo. Further, the single numeral may present on the right portion succeeding the three letters.

Figure 33:
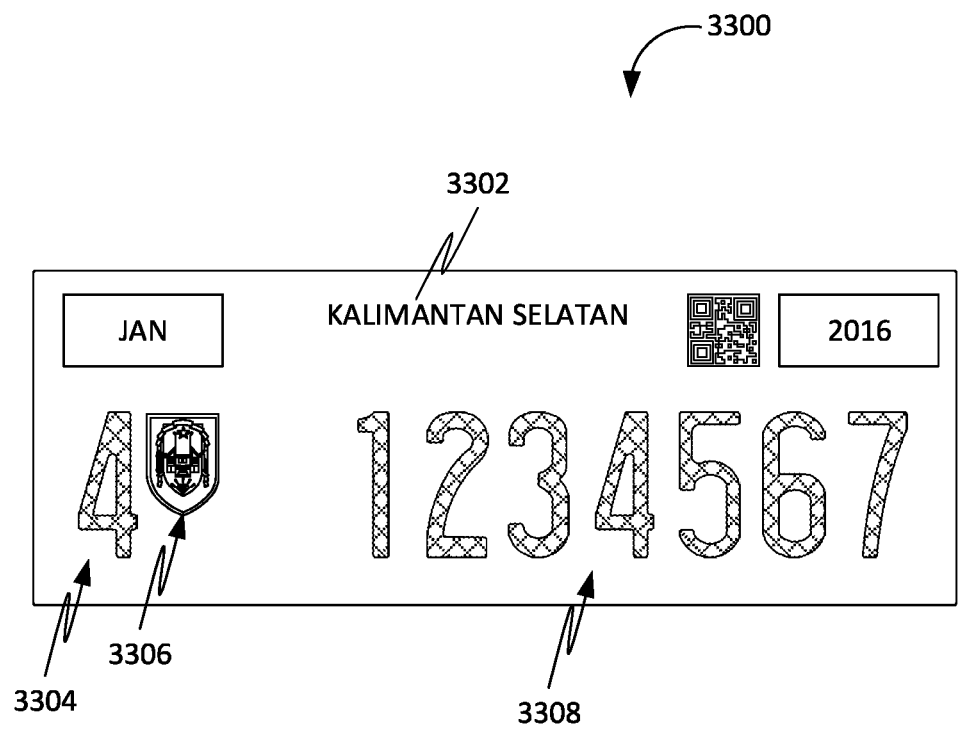
FIG. 33 illustrates a license plate of the vehicle, in accordance with some embodiments.

FIG. 33 illustrates a license plate 3300 of the vehicle, in accordance with some embodiments. Further, the license plate 3300 may include a license plate image 3302. Further, the license plate image 3302 may be associated with a commercial vehicle. Further, the commercial vehicle may be the vehicle type identifier. Further, the at least one symbol segment may include a first symbol segment 3304, a second symbol segment 3306, and a third symbol segment 3308. Further, the first symbol segment 3304 may include a single numeral. Further, the single numeral represents the province. Further, the second symbol segment 3306 may include a logo associated with the province. Further, the third symbol segment 3308 may include seven numerals in at least one combination of the seven numerals. Further, the single numeral may be present on a left portion of the license plate image 3302. Further, the logo may be present on the left portion succeeding the single numeral. Further, the seven numerals may be present on a right portion of the license plate image 3302 succeeding the logo.

Figure 34:
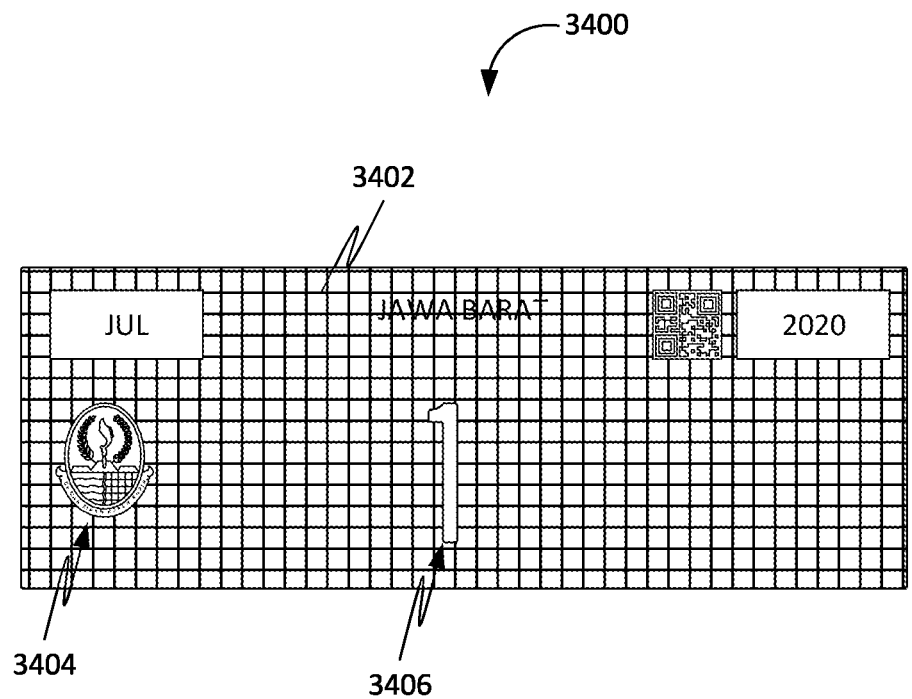
FIG. 34 illustrates a license plate of the vehicle, in accordance with some embodiments.

FIG. 34 illustrates a license plate 3400 of the vehicle, in accordance with some embodiments. Further, the license plate 3400 may include a license plate image 3402. Further, the license plate image 3402 may be associated with a local government vehicle. Further, the local government vehicle may be the vehicle type identifier. Further, the at least one symbol segment may include a first symbol segment 3404 and a second symbol segment 3406. Further, the first symbol segment 3404 may include a logo associated with the province. Further, the second symbol segment 3406 may include a numeral. Further, the logo may be present on a left portion of the license plate image 3402. Further, the numeral may be present on a center portion of the license plate image 3402.

Figure 35:
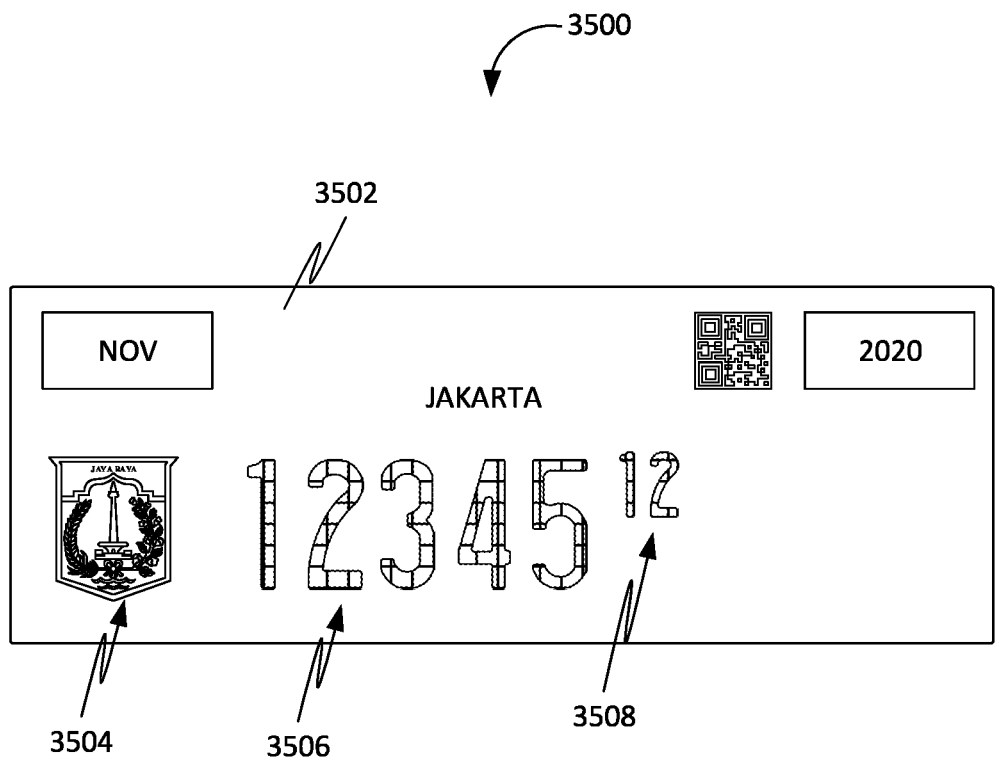
FIG. 35 illustrates a license plate of the vehicle, in accordance with some embodiments.

FIG. 35 illustrates a license plate 3500 of the vehicle, in accordance with some embodiments. Further, the license plate 3500 may include a license plate image 3502. Further, the license plate image 3502 may be associated with a consulate general vehicle. Further, the consulate general vehicle may be the vehicle type identifier. Further, the at least one symbol segment may include a first symbol segment 3504, a second symbol segment 3506, and a third symbol segment 3508. Further, the first symbol segment 3504 may include a logo associated with the province. Further, the second symbol segment 3506 may include five numerals in at least one combination of the five numerals. Further, the third segment may include at least one numeral in at least one combination of the at least one numeral. Further, the at least one numeral of the third symbol segment 3508 may be an identification of diplomats of a country. Further, the logo may be present on a left portion of the license plate image 3502. Further, the five numerals may be present on a center portion of the license plate image 3502. Further, the at least one numeral may be present on the center portion succeeding the five numerals.

Figure 36:
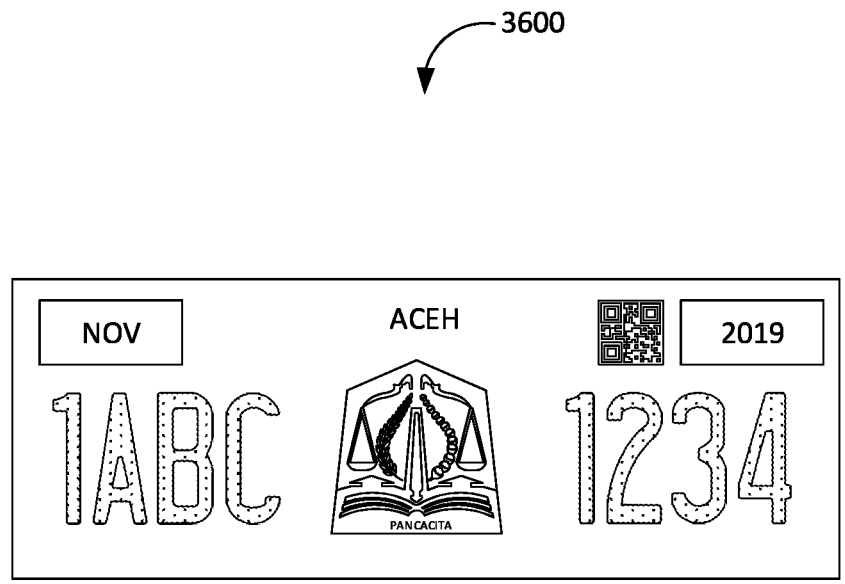
FIG. 36 illustrates a license plate of the vehicle, in accordance with some embodiments.

FIG. 36 illustrates a license plate 3600 of the vehicle, in accordance with some embodiments. Further, a first symbol of the plurality of symbols associated with the license plate 3600 may include a background of the license plate image. Further, the background may be associated with a background color. Further, the background color of the background corresponds to the at least one of the geographical region identifier and the vehicle type identifier. Further, a second symbol of the plurality of symbols associated with the license plate 3600 may include a barcode. Further, the barcode may be associated with a barcode color. Further, the barcode color may include a blue color, a black color, etc. Further, the blue color represents the vehicle may be an electric vehicle. Further, the barcode may be configured to be scanned by at least one device. Further, the at least one device configured for scanning the barcode. Further, the at least one device presents at least one barcode information associated with the vehicle based on the scanning. Further, the at least one barcode information may include vehicle's owner, owner's address, vehicle type, vehicle's color, vehicle's chassis number, vehicle's engine number, vehicle's year product, vehicle's expiration date of registration, etc. Further, the license plate 3600 may be associated with a private vehicle and four or more wheeled vehicle. Further, the background color may be a white color.

Figure 37:
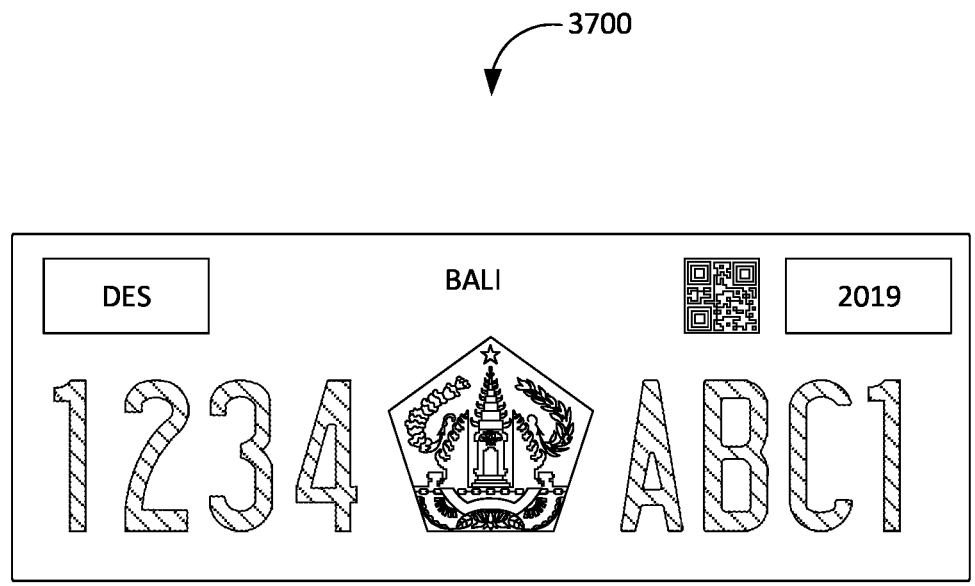
FIG. 37 illustrates a license plate of the vehicle, in accordance with some embodiments.

FIG. 37 illustrates a license plate 3700 of the vehicle, in accordance with some embodiments. Further, a first symbol of the plurality of symbols associated with the license plate 3700 may include a background of the license plate image. Further, the background may be associated with a background color. Further, the background color of the background corresponds to the at least one of the geographical region identifier and the vehicle type identifier. Further, the license plate 3700 may be associated with a private vehicle and two-wheeled vehicle or three-wheeled vehicle. Further, the background color may be a white color.

Figure 38:
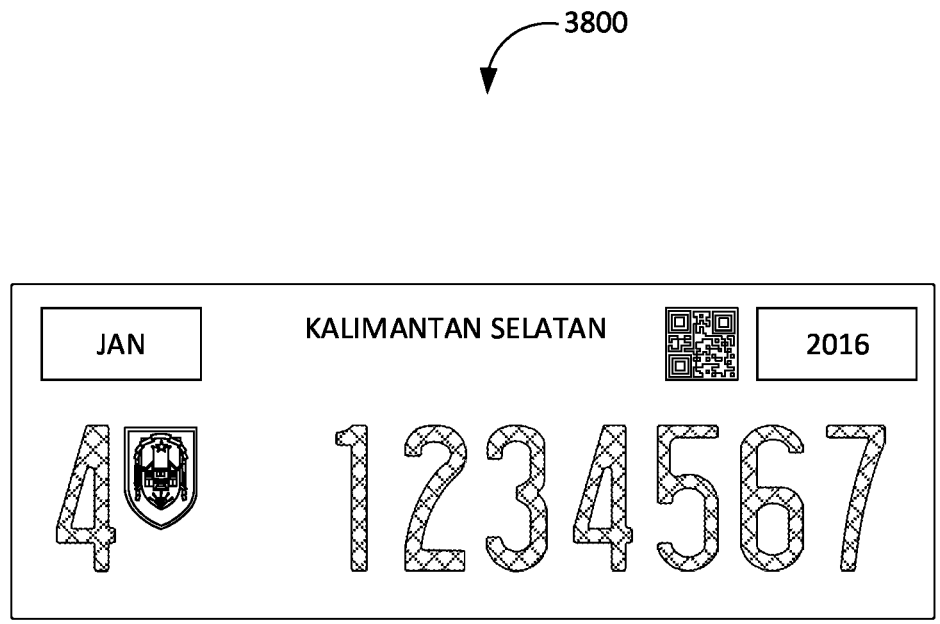
FIG. 38 illustrates a license plate of the vehicle, in accordance with some embodiments.

FIG. 38 illustrates a license plate 3800 of the vehicle, in accordance with some embodiments. Further, a first symbol of the plurality of symbols associated with the license plate 3800 may include a background of the license plate image. Further, the background may be associated with a background color. Further, the background color of the background corresponds to the at least one of the geographical region identifier and the vehicle type identifier. Further, the license plate 3800 may be associated with a commercial vehicle. Further, the background color may be a white color.

Figure 39:
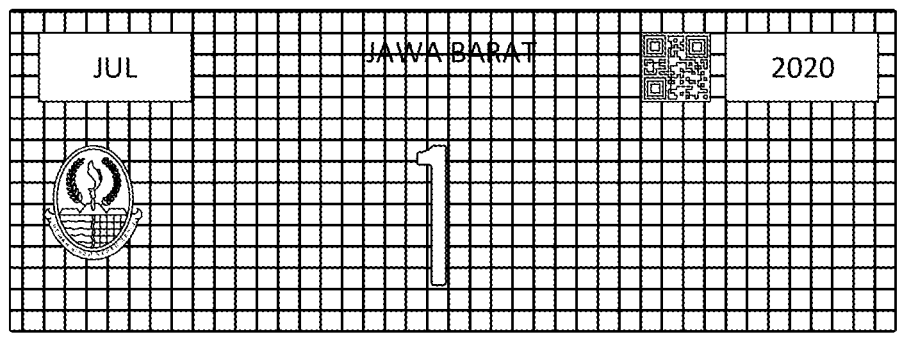
FIG. 39 illustrates a license plate of the vehicle, in accordance with some embodiments.

FIG. 39 illustrates a license plate 3900 of the vehicle, in accordance with some embodiments. Further, a first symbol of the plurality of symbols associated with the license plate 3900 may include a background of the license plate image. Further, the background may be associated with a background color. Further, the background color of the background corresponds to the at least one of the geographical region identifier and the vehicle type identifier. Further, the license plate 3900 may be associated with a local government vehicle. Further, the background color may be a plurality of colors based on the province associated with the vehicle. Further, the background color may be a green color on Sumatra island of Indonesia. Further, the background color may be a navy blue on Java Island of Indonesia.

Figure 40:
FIG. 40 illustrates a license plate of the vehicle, in accordance with some embodiments.

FIG. 40 illustrates a license plate 4000 of the vehicle, in accordance with some embodiments. Further, a first symbol of the plurality of symbols associated with the license plate 4000 may include a background of the license plate image. Further, the background may be associated with a background color. Further, the background color of the background corresponds to the at least one of the geographical region identifier and the vehicle type identifier. Further, the license plate 4000 may be associated with a consulate general vehicle. Further, the background color may be a white color.

Figure 41:
FIG. 41 illustrates a license plate of the vehicle, in accordance with some embodiments.

FIG. 41 illustrates a license plate 4100 of the vehicle, in accordance with some embodiments. Further, a first symbol of the plurality of symbols associated with the license plate 4100 may include a background of the license plate image. Further, the background may be associated with a background color. Further, the background color of the background corresponds to the at least one of the geographical region identifier and the vehicle type identifier. Further, the license plate 4100 may be associated with a corps diplomatic vehicle. Further, the background color may be a white color.

Although the present disclosure has been explained in relation to its preferred embodiment, it is to be understood that many other possible modifications and variations can be made without departing from the spirit and scope of the disclosure.

What is claimed is:

1. A method for facilitating licensing of a vehicle, the method comprising:
   receiving, using a communication device, vehicle information associated with the vehicle from at least one device;
   analyzing, using a processing device, the vehicle information;
   determining, using the processing device, a plurality of identifiers associated with the vehicle based on the analyzing, wherein the plurality of identifiers comprises each of a geographical region identifier and a vehicle type identifier associated with the vehicle;
   generating, using the processing device, a plurality of symbols corresponding to the plurality of identifiers based on the determining, wherein the plurality of symbols comprises a plurality of visual features, wherein the plurality of visual features comprises at least one of a color, a shape, a size, and a location of the plurality of symbols, wherein at least one visual feature of the plurality of visual features corresponds to at least one identifier of the plurality of identifiers, wherein the plurality of symbols uniquely and visually represents the plurality of identifiers;
   generating, using the processing device, a license plate image for a license plate of the vehicle based on the generating of the plurality of symbols, wherein the license plate image comprises the plurality of symbols;
   transmitting, using the communication device, the license plate image associated with the vehicle to the at least one device; and
   storing, using a storage device, the license plate image and the vehicle information.

2. The method of claim 1 further comprising:
   receiving, using the communication device, a first license plate image associated with a first license plate of a first vehicle from at least one first device;
   analyzing, using the processing device, the first license plate image;
   identifying, using the processing device, the plurality of symbols and the plurality of visual features of the plurality of symbols comprised in the first license plate image based on the analyzing of the first license plate image;
   generating, using the processing device, first vehicle information associated with the first vehicle based on the identifying; and
   transmitting, using the communication device, the first vehicle information associated with the first vehicle to the at least one first device.

3. The method of claim 1, wherein the license plate image comprises the plurality of symbols in at least one format based on at least one of the geographical region identifier and the vehicle type identifier, wherein the at least one format corresponds to at least one arrangement of at least one symbol segment of the plurality of symbols on the license plate image.

4. The method of claim 3, wherein the plurality of first symbols and a plurality of first visual features associated with the plurality of first symbols forms at least one visual identifier of the vehicle, wherein the at least one visual identifier corresponds to the at least one identifier of the vehicle, wherein the at least one visual identifier is visually perceivable by at least one individual.

5. The method of claim 3, wherein the plurality of second symbols and a plurality of second visual features associated with the plurality of second symbols forms at least one first visual identifier of the vehicle, wherein the at least one first visual identifier corresponds to the at least one identifier of the vehicle, wherein the at least one first visual identifier is visually perceivable by at least one external device.

6. The method of claim 1, wherein each symbol of the plurality of symbols is associated with a range of predetermined symbols, wherein each visual feature of the plurality of visual features is associated with a range of predetermined visual features, wherein the range of predetermined symbols and the range of predetermined visual features of the range of predetermined symbols characterizes the license plate image for visually identifying a validity of the license plate image.

7. The method of claim 1, wherein the license plate comprises a display device disposed on the license plate, wherein the display device is configured for displaying the license plate image, wherein the method further comprises transmitting, using the communication device, the license plate image to the display device, wherein the displaying of the license plate image is based on transmitting.

8. The method of claim 7, wherein the license plate comprises at least one location sensor configured for generating at least one location information associated with a geographical location of the vehicle, wherein the method further comprises:
receiving, using the communication device, the at least one location information from the at least one location sensor;
analyzing, using the processing device, the at least one location information;
determining, using the processing device, the geographical region identifier of the vehicle based on the analyzing of the at least one location information;
identifying, using the processing device, at least one symbol of the plurality of symbols based on the determining of the geographical region identifier, wherein the at least one symbol visually represents the geographical region identifier; and
transmitting, using the communication device, the at least one symbol to the display device, wherein the display device is configured for displaying the at least one symbol.

9. The method of claim 7, wherein the license plate comprises at least one sensor configured for generating at least one sensor data associated with at least one of a cargo and a passenger transported by the vehicle, wherein the method further comprises:
receiving, using the communication device, the at least one sensor data from the at least one sensor;
analyzing, using the processing device, the at least one sensor data;
identifying, using the processing device, the at least one of the cargo and the passenger transported by the vehicle based on the analyzing;
determining, using the processing device, the vehicle type identifier of the vehicle based on the identifying of the at least one of the cargo and the passenger;
identifying, using the processing device, at least one third symbol of the plurality of symbols based on the determining of the vehicle type identifier, wherein the at least one third symbol visually represents the vehicle type identifier; and
transmitting, using the communication device, the at least one third symbol to the display device, wherein the display device is configured for displaying the at least one third symbol.

10. The method of claim 7 further comprising:
receiving, using the communication device, a plurality of location information from a plurality of location sensors associated with a plurality of license plates of a plurality of vehicles;
analyzing, using the processing device, the plurality of location information based on a preselected geographical region identifier of the geographical region identifier;
identifying, using the processing device, a plurality of selected vehicles of the plurality of vehicles based on the analyzing of the plurality of location information; and
transmitting, using the processing device, a preselected symbol of the plurality of symbols to a plurality of display devices of a plurality of selected license plates of the plurality of selected vehicles, wherein the plurality of display devices is configured for displaying the preselected symbol.

11. A system for facilitating licensing of a vehicle, the system comprising:
a communication device configured for:
receiving vehicle information associated with the vehicle from at least one device; and
transmitting a license plate image associated with the vehicle to the at least one device;
a processing device communicatively coupled with the communication device, wherein the processing device is configured for:
analyzing the vehicle information;
determining a plurality of identifiers associated with the vehicle based on the analyzing, wherein the plurality of identifiers comprises each of a geographical region identifier and a vehicle type identifier associated with the vehicle;
generating a plurality of symbols corresponding to the plurality of identifiers based on the determining, wherein the plurality of symbols comprises a plurality of visual features, wherein the plurality of visual features comprises at least one of a color, a shape, a size, and a location of the plurality of symbols, wherein at least one visual feature of the plurality of visual features corresponds to at least one identifier of the plurality of identifiers, wherein the plurality of symbols uniquely and visually represents the plurality of identifiers; and
generating the license plate image for a license plate of the vehicle based on the generating of the plurality of symbols, wherein the license plate image comprises the plurality of symbols; and
a storage device communicatively coupled to the processing device, wherein the storage device is configured for storing the license plate image and the vehicle information.

12. The system of claim 1, wherein the communication device is further configured for:
receiving a first license plate image associated with a first license plate of a first vehicle from at least one first device; and
transmitting first vehicle information associated with the first vehicle to the at least one first device, wherein the processing device is further configured for:
analyzing the first license plate image;
identifying the plurality of symbols and the plurality of visual features of the plurality of symbols comprised in the first license plate image based on the analyzing of the first license plate image; and
generating the first vehicle information associated with the first vehicle based on the identifying.

13. The system of claim 1, wherein the license plate image comprises the plurality of symbols in at least one format based on at least one of the geographical region identifier and the vehicle type identifier, wherein the at least one format corresponds to at least one arrangement of at least one symbol segment of the plurality of symbols on the license plate image.

14. The system of claim 13, wherein the plurality of first symbols and a plurality of first visual features associated with the plurality of first symbols forms at least one visual identifier of the vehicle, wherein the at least one visual identifier corresponds to the at least one identifier of the vehicle, wherein the at least one visual identifier is visually perceivable by at least one individual.

15. The system of claim 13, wherein the plurality of second symbols and a plurality of second visual features associated with the plurality of second symbols forms at least one first visual identifier of the vehicle, wherein the at least one first visual identifier corresponds to the at least one identifier of the vehicle, wherein the at least one first visual identifier is visually perceivable by at least one external device.

16. The system of claim 1, wherein each symbol of the plurality of symbols is associated with a range of predetermined symbols, wherein each visual feature of the plurality of visual features is associated with a range of predetermined visual features, wherein the range of predetermined symbols and the range of predetermined visual features of the range of predetermined symbols characterizes the license plate image for visually identifying a validity of the license plate image.

17. The system of claim 1, wherein the license plate comprises a display device disposed on the license plate, wherein the display device is configured for displaying the license plate image, wherein the communication device is further configured for transmitting the license plate image to the display device, wherein the displaying of the license plate image is based on transmitting.

18. The system of claim 17, wherein the license plate comprises at least one location sensor configured for generating at least one location information associated with a geographical location of the vehicle, wherein the communication device is further configured for:
   receiving the at least one location information from the at least one location sensor; and
   transmitting at least one symbol to the display device, wherein the display device is configured for displaying the at least one symbol, wherein the processing device is further configured for:
   analyzing the at least one location information;
   determining the geographical region identifier of the vehicle based on the analyzing of the at least one location information; and
   identifying the at least one symbol of the plurality of symbols based on the determining of the geographical region identifier, wherein the at least one symbol visually represents the geographical region identifier.

19. The system of claim 17, wherein the license plate comprises at least one sensor configured for generating at least one sensor data associated with at least one of a cargo and a passenger transported by the vehicle, wherein the communication device is further configured for:
   receiving the at least one sensor data from the at least one sensor; and
   transmitting at least one third symbol to the display device, wherein the display device is configured for displaying the at least one third symbol, wherein the processing device is further configured for:
   analyzing the at least one sensor data;
   identifying the at least one of the cargo and the passenger transported by the vehicle based on the analyzing;
   determining the vehicle type identifier of the vehicle based on the identifying of the at least one of the cargo and the passenger; and
   identifying the at least one third symbol of the plurality of symbols based on the determining of the vehicle type identifier, wherein the at least one third symbol visually represents the vehicle type identifier.

20. The system of claim 17, wherein the communication device is further configured for:
   receiving a plurality of location information from a plurality of location sensors associated with a plurality of license plates of a plurality of vehicles; and
   transmitting a preselected symbol of the plurality of symbols to a plurality of display devices of a plurality of selected license plates of a plurality of selected vehicles of the plurality of vehicles, wherein the plurality of display devices is configured for displaying the preselected symbol, wherein the processing device is further configured for:
   analyzing the plurality of location information based on a preselected geographical region identifier of the geographical region identifier; and
   identifying the plurality of selected vehicles of the plurality of vehicles based on the analyzing of the plurality of location information.

* * * * *